(12) United States Patent
Wink

(10) Patent No.: US 8,777,324 B2
(45) Date of Patent: Jul. 15, 2014

(54) COMPOSITE BODIED TRAILER

(75) Inventor: James W. Wink, Rockport, IN (US)

(73) Assignee: Joper, SA de CV (MX)

( * ) Notice: Subject to any disclaimer, the term of this patent is extended or adjusted under 35 U.S.C. 154(b) by 0 days.

(21) Appl. No.: 13/513,577

(22) PCT Filed: Dec. 7, 2010

(86) PCT No.: PCT/US2010/059304
§ 371 (c)(1),
(2), (4) Date: Jun. 3, 2012

(87) PCT Pub. No.: WO2011/071930
PCT Pub. Date: Jun. 16, 2011

(65) Prior Publication Data
US 2013/0069417 A1    Mar. 21, 2013

Related U.S. Application Data

(60) Provisional application No. 61/283,644, filed on Dec. 7, 2009, provisional application No. 61/337,670, filed on Feb. 8, 2010.

(51) Int. Cl.
*B60P 1/12* (2006.01)

(52) U.S. Cl.
USPC .......................................... 298/19 R; 298/24

(58) Field of Classification Search
USPC ......... 298/19 R, 22 AE, 17 R, 22 R, 17.7, 13, 298/17.6, 22 P, 22 F, 21 R, 19 V, 23 MD, 25
See application file for complete search history.

(56) References Cited

U.S. PATENT DOCUMENTS

| | | | | |
|---|---|---|---|---|
| 1,805,489 A | * | 5/1931 | Kerr et al. | 296/183.1 |
| 3,181,761 A | * | 5/1965 | Bartlett | 298/20 A |
| 3,209,905 A | * | 10/1965 | Kean, Sr. | 206/597 |
| 4,230,360 A | * | 10/1980 | Eisenman | 296/183.1 |
| 5,026,112 A | | 6/1991 | Rice | |
| 5,456,511 A | | 10/1995 | Webber | |
| 5,456,521 A | * | 10/1995 | Moyna | 298/1 B |
| 5,482,356 A | * | 1/1996 | Goodson, Jr. | 298/22 AE |

(Continued)

FOREIGN PATENT DOCUMENTS

WO        WO 00/24606        5/2000

OTHER PUBLICATIONS

WIPO, Wink PCT Application PCT/US2010/059304, International Search Report and Written Opinion of Search Authority, Feb. 8, 2011.

*Primary Examiner* — Glenn Dayoan
*Assistant Examiner* — Sunsurraye Westbrook
(74) *Attorney, Agent, or Firm* — E. Victor Indiano; Indiano Law Group LLC

(57) ABSTRACT

A dump bed assembly (18) is provided for coupling to a truck having a chassis (22) for supporting the dump bed assembly (18). The dump bed assembly (18) includes a cargo receiving dump bed (13) coupled to the chassis (22) and movable between a travel configuration and a dump configuration. The dump bed includes a metal skeletal frame (85) including a plurality of frame members that define a plurality of openings (171) between the frame members. A plastic bed (90) comprises at least one plastic bed member coupled to and supported by the plurality of frame members. The plastic bed member extends into the openings defined by the frame members.

21 Claims, 26 Drawing Sheets

(56) References Cited

U.S. PATENT DOCUMENTS

| | | | |
|---|---|---|---|
| 5,758,927 A * | 6/1998 | Koester | 298/22 AE |
| 5,906,417 A * | 5/1999 | Golden | 298/17.6 |
| 6,623,234 B1 * | 9/2003 | Herring et al. | 414/528 |
| 6,672,822 B1 * | 1/2004 | Moyna | 414/517 |
| 6,688,673 B2 * | 2/2004 | Kloepfer | 296/181.1 |
| 6,905,175 B1 * | 6/2005 | Verros | 298/17.7 |
| 2006/0232120 A1 * | 10/2006 | Linares et al. | 298/1 A |

* cited by examiner

COMPOSITE BODIED TRAILER

PRIORITY STATEMENT

The present application claims benefit of James W. Wink U.S. Provisional Patent Applications Nos. 61/283,644 that was filed on 7 Dec. 2009, and 61/337,670 that was filed on 8 Feb. 2010 and which are fully incorporated herein.

I. TECHNICAL FIELD OF THE INVENTION

The present invention relates to truck trailers, and more particularly to a truck trailer containing both metal and plastic components.

II. BACKGROUND OF THE INVENTION

Dump trailers are employed for hauling loads of bulk products, such as coal, scrap metal, dirt, and the like. Dump trailers are different than regular trailers. as a dump trailer typically includes a hydraulic or pneumatic cylinder that can cause the trailer to pivot between a travel position, wherein the trailer is disposed generally horizontally or parallel to the road surface upon which it is traveling, and a tilted or "dump position" wherein the dump trailer is placed at up to a 45 degree angle to the road surface on which it is traveling. When in the dump position, the trailer is capable of emptying its load from the trailer onto whatever surface is behind the trailer.

Dump trailers typically come in two primary species, including round bottom trailers and square bottom or rectangular cross section or "square bottom" trailers. Examples of round bottom trailers are those manufactured by Alumitech, and also by Mac Trailers. Mac Trailers uses a trailer design that was originally created by the Applicant, and produced by American Trailer Manufacture Co., Inc., of Rockport, Ind. American Trailer manufactures a dump trailer that is designed for being pulled by a semi-tractor. The trailer has a generally hemi-cylindrical shape, so that it has a half-round cross-section. The top of the trailer is open so that bulk load materials such as scrap, coal, dirt and grain can be loaded into the trailer by bucket loaders. Although the trailers come in different lengths, most trailers have a length of between about 24 and 53 feet.

The front of the trailer includes a king pin that is positioned for insertion into a fifth wheel of a semi-tractor. A hydraulic, or pneumatic cylinder is pivotably coupled to the front of the trailer to lift the front end of the bed of trailer upwardly, so that the load in the trailer can be dumped out of a rear-mounted gate of the trailer. A pair of draft arms are disposed under the dump bed, and pivotably connected to the dump bed to provide support for the dump bed as it moved between its down (or travel) position and its raised (or dump) position.

In addition to the half-round trailer produced by American Trailer Manufacturer, other open top trailers existed that are designed for carrying bulk loads, such as square ("Flat") bottom dump trailers and "hopper trailers". Hopper trailers are not designed for being tilted like a dump trailer. Rather, hopper trailers include closeable chutes that are formed on the underside of the dump trailer. In order to unload materials from a hopper trailer, the trailer is pulled over a pit-like receiving area, and the chutes are opened to allow the materials within the bed of the trailer to flow through the chutes and into the pit-like receiving area.

Although the above mentioned trailers do perform their respective duties in a workman-like manner, room for improvement exists. Two areas where room for improvement exists relate to: (1) the carrying capacity of the trailer; and (2) the repairability of the trailer.

The load limit of a bulk material containing trailer is usually defined not by volume, but by weight. In many situations, the user cannot fill all available space within a trailer with the "cargo" because to completely fill the trailer would place the trailer and its load above load limits that are permitted by relevant state and federal statutes. As such, many bulk trailers operate at a less-than-full "volumetric load". While being full from a weight perspective, these loads do not fill the volumetric capacity of the trailer.

Since the trailer is at less than full volumetric capacity, one could increase the volume and weight of cargo carried if one were able to reduce the weight of the trailer, since the load weight of the cargo-carrying trailer is a combined function of the weight of the cargo and the weight of the trailer itself. For example, if the weight of the trailer were reduced by 1000 pounds, the trailer might still have the volumetric capacity to carry an extra 1,000 pounds of cargo while still meeting the federally and state mandated weight load limits.

The price charged by trucking companies for carrying a load is usually a function of both weight and volume. The ability to carry a load that includes 1,000 pounds of additional cargo would enable the trucker to charge additional monies to the shipper. In this regard, the Applicant believes that a weight savings of approximately 1,000 pounds in trailer weight. that enables the user to carry an additional 1.000 pounds of cargo per load would enable the trucker to earn sufficient extra marginal revenue, to pay for the trailer in five years. This is no small feat in view of the fact that trailers such as the ones of the instant invention likely cost somewhere between $40,000 and $50,000.00.

A second problem that exists with current dump trailers relates to repairability. Unfortunately, dump trailers have a tendency to become damaged during use and to have their useful life cut short because of accidents. In addition to the normal type of "on-the-road" accidents that one might expect to encounter due to jack knifing and other accidents, dump trailers are likely to become damaged due to roll overs or turn overs during those times when the dump bed is elevated, and the load is being dumped. Roll overs are often caused during dumping, because the wheels are on uneven terrain during the dump.

Simple notions of physics, torque and high centers of gravity suggest that a trailer has an increased probability of rolling over when it has its rear wheels placed on uneven ground and its dump bed elevated, so that the load is far removed from the pivot point defined by the intersection of the back wheels and the terrain. One might expect that the rollover forces exerted on the lifted dump trailer would not be that great because the load would become dumped out of the trailer as the bed was elevated. However, it often occurs that a load becomes "stuck" in the trailer bed, and does not slide out readily when the dump bed is lifted. As such, the front end of the trailer can be in a position where it is raised a significant (e.g. 20 to 30 feet) distance above the ground, and contains a significant amount of additional weight due all or part of the cargo being still resident in the inside of the trailer bed. Surprisingly, it is estimated that approximately 40% of dump trailers will, at some point during their existence, roll over during some sort of dump accident. When the trailer rolls over, it must either be repaired or become "totaled".

Typical known prior art dump trailers are comprised of several aluminum or steel sheets that are welded together and welded together and maintained in place by a series of external skeleton members, such as top rails and lower rails, that extend along the length of the trailer. After a roll over, the most typical repair required is to cut out and replace a significant amount of the aluminum sheet that comprises the round or square bed, along with one or more several foot-long sections of rail. It is estimated by the Applicant that a typical roll over will result in somewhere between $15,000.00 and $25,000.00 of damage inflicted upon the trailer. To place this in perspective, this $15,000.00 to $25,000.00 constitutes somewhere approximately between 30% and 60% of the cost of a new $45,000.00 trailer.

It would be beneficial to provide a trailer that was capable of being repaired less expensively in the case of such a roll over accident. Therefore, one object of the present invention is to provide a trailer that has a greater potential to have a lighter weight than current known trailers. It is also an object of the present invention to provide a trailer that has a potential to have lower repair costs than currently known trailers.

III. SUMMARY OF THE INVENTION

In accordance with the present invention, a dump bed assembly is provided for coupling to a truck having a chassis for supporting the dump bed assembly. The dump bed assembly comprises a cargo receiving dump bed coupled to the chassis and movable between a travel configuration and a dump configuration. The dump bed includes a metal skeletal frame comprising a plurality of frame members that define a plurality of openings between the frame members. A plastic bed comprises a plurality of plastic bed members coupled to and supported by the plurality of frame members. The plastic bed members extend into the openings defined by the frame members.

The plastic panel and metal skeleton construction of the present invention has several advantages, over the all-metal construction of the prior art. It is believed that a trailer constructed according to the present invention will generally be easier to repair, and will weigh less than conventional trailers, thereby enabling the user to take larger loads than with conventional trailers.

Preferably, the external skeleton includes a first top rail member, and a second top rail member. The first and second top rail members extend in a generally parallel, longitudinal relationship along the top of the trailer. First and second lower, longitudinally extending frame members extend in a generally parallel longitudinal relationship, and along the lower portion of the trailer. The first and second lower frame members extend in a generally spaced, parallel relationship. The aluminum frame member also includes at least one lateral member that extends in a plane generally perpendicular to the axis of the upper and lower longitudinal frame members.

Also, a sheet-like saddle member can be provided that is disposed between the first and second lower longitudinally extending frame members. The saddle member has an arcuate upper surface that is sized and configured for receiving and supporting the lower surface of the lowest portion of the plastic bed member.

Preferably, the plastic bed member includes a first edge portion and a second edge portion. The first edge portion is receivable within a slotted receiver formed in the first top rail member, and second edge portion is received within a slotted receiver formed in the second top rail member. The plastic bed member and slotted receiver of the top rail members are sized to permit the plastic member to be retained through size changes induced by thermal expansion and contraction of the plastic member.

One feature of the present invention is that it includes a plastic bed member. The plastic bed member, when coupled with the external metal frame of the present invention provides a trailer that is strong, rigid, and preferably light weight. One advantage achieved by the use of the plastic bed member is that the plastic bed member is resistant to rust.

The plastic panel and metal skeleton construction of the present invention has several advantages, over the all-metal construction of the prior art. It is believed that a trailer constructed according to the present invention will generally be easier to repair, and will weigh less than conventional trailers, thereby enabling the user to take larger loads than with conventional trailers.

These and other features of the present invention will become apparent to those skilled in the art upon a review of the drawings and detailed description present below, that represent the best mode of practicing the invention perceived presently by the Applicant.

IV. BRIEF DESCRIPTION OF DRAWINGS

FIG. 14A is an enlarged view of the panel clamping member of the corrugated panel embodiment of the present invention;

FIG. 24 is an enlarged sectional view of an upper panel holding bracket.

V. DETAILED DESCRIPTION OF PREFERRED EMBODIMENT

Figure 1:
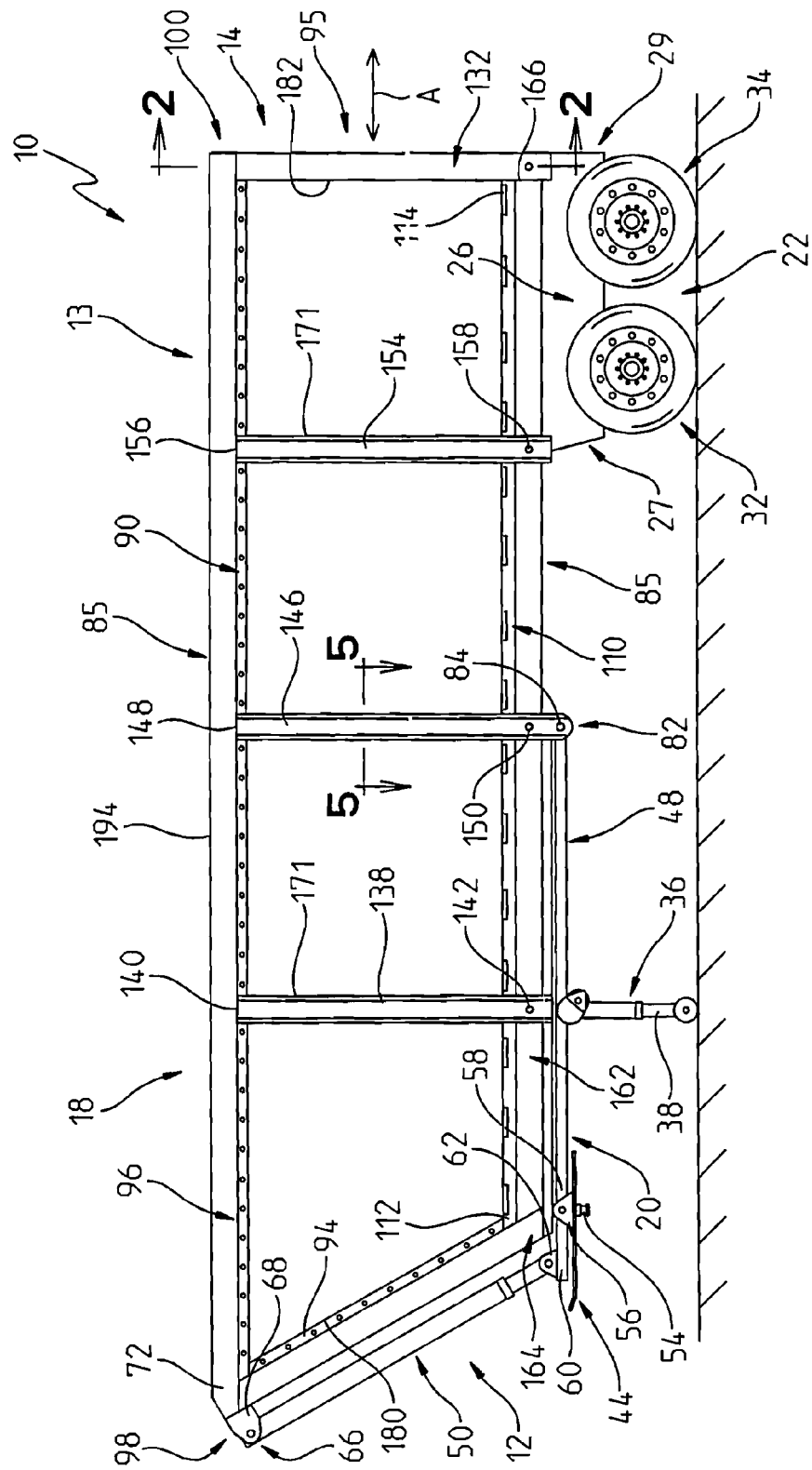
FIG. 1 is a side view of a trailer of the present invention.

A trailer 10 of the present invention is shown in FIGS. 1-10 as comprising a "half-round" dump-type frailer 10. A half-round dump trailer is so named because in cross-section, the trailer has a half-round shape. More accurately, the trailer 10 generally comprises a hemi-cylindrical type of structure having a long axis A that extends generally parallel to the direction of travel of the trailer.

The trailer 10 includes a first or front end 12, and a second or rear end 14. The primary components of the trailer 10 comprise the dump bed assembly 18, that comprises the area where the cargo holding dump bed 13 portion of the trailer, dump bed 13, and the various supporting structures associated therewith. The second primary component is the lift assembly 20 and the third primary component is the chassis, that includes the suspension wheel and assembly 22. The lift assembly 20 comprises those components whose purpose it is to move the bed 18 between its rest (travel) position (shown in the figures) wherein the bed is generally disposed parallel to the ground; and a lift position (not shown) wherein the front end 12 of the trailer 10 is raised relative to the rear end 14, so that a load contained within the bed 18 will slide rearwardly and hopefully, out of the back end gate of the trailer.

The chassis of the trailer includes a suspension wheel assembly 22 that is disposed generally at the second (rear) end 14 of the trailer 10, and includes the suspension for the trailer 10, and of the ground-engaging wheels 32, 34 on which the trailer 10 rides. The suspension wheel assembly 22 includes a suspension frame 27 that has a forward portion disposed generally forwardly of the tandem wheels 32, 34 and a rear portion 29 disposed generally close to the gate member. The suspension frame 27 includes a first sub-frame member 30 (FIG. 3) and a second sub-frame member 31. The first and second sub-frame members 30, 31 are preferably welded, or otherwise fixedly coupled to the underside of the bed assembly 18.

A suspension member, that can comprise springs, air bags, and the like, is coupled to the suspension frame 26. A wide variety of various suspension members and configurations are useable with the trailer of the present invention. In this regard, the reader's attention is directed to the various trailer suspensions systems produced by the Hendrickson Company that can be viewed at www.hendrickson.intl.com/products/trailer, and which are fully incorporated herein. The axles include brakes and tire engaging assemblies to which the tires 32, 34 are coupled. The ground engaging tires 32, 34 are shown in a "tandem axle" configuration. Tandem axle configurations include a relatively forward set of four wheels 32 and a relatively rearwardly disposed set of four wheels 34. Other configurations exist such as single triple axle and quad axle configurations.

A dolly wheel 36 extends downwardly from of the bed assembly 18. The dolly wheels 36 include a telescopically mounted, ground engaging portion 38. The relative length of the dolly arm 36 can be adjusted, by moving the telescopically adjustably positionable, ground engaging member 38. Dolly wheels 36 are used when the trailer 10 is going to be parked to serve as a frontal support for the trailer 10 when the trailer 10 is not hooked to any tractor.

The lift assembly 20 includes three primary components including the front platform 44, draft arms 48 and a hydraulic (or pneumatic) lift cylinder 50. The front platform 44 is part of the trailer to tractor coupling mechanism of the trailer 10, and includes a downwardly extending king pin 54, that is received by a fifth wheel receptacle of a tractor. The front platform includes a pivotal coupling mechanism 56 for pivotably coupling the first (lower) portion of the draft arms 48 to the upper surface of the front platform 44. The front platform 44 also includes a second pivotal coupling member, for pivotably coupling the lower end 62 of the hydraulic cylinder 50 to the upper surface of the front platform 44.

The hydraulic cylinder 50 includes an upper end 66 that includes a pivotal coupling 68, for pivotably coupling the upper end 66 of the cylinder 50, to a centrally disposed frontal frame member 72, that is disposed at the upper end of the front surface of the trailer bed 18. Cylinder 50 is movable between its collapsed position, and an extended position. In the collapsed position (FIG. 1), the telescoping members within the cylinder 50 are in their collapsed orientation, so that the trailer bed 18 is lowered to a position where it is generally parallel with the road surface on which the trailer rests.

In the raised position, the telescoping member of the cylinder 50 is fully extended, so that the forward end 12 of the trailer bed 18 is raised upwardly relative to the platform 44, and the rear end 14, that remains planted upon the ground surface. This places the trailer bed 18 at a forward up/back down angle, loads contained within the bed 18 move under the influence of gravity from the front 12 of the trailer 10 to toward the rear 14 of the trailer, and preferably out the gate 95 of the trailer.

Concurrently, with the movement of the cylinder 50 from its rest position (FIG. 1) to its dump position (not shown), the forward end 58 of the draft arms 48 pivots relative to the front platform member 44. Additionally, the rear end 82 of the draft arms 48 are pivotably coupled by pivot 84 to a frame member of the trailer that is disposed underneath the trailer bed 18. This pivotal coupling the draft arms 48, and the forward platform 44, and the trailer bed 18, enables the trailer bed 18 to pivot backwardly and upwardly to its dump position. The draft arms 48 help to provide stability for the trailer 10, when in the upper position, and also when in the rest position. Without the draft arms, it is likely that the trailer would lose stability about an axis defined generally by the longitudinal axis of the trailer 10, and therefore would be more likely to rollover.

The bed 13 includes a metal external skeletal portion 85, and a plastic bed liner 90. The metal external skeleton includes a plurality of components. Although the skeleton can be made from steel or aluminum, the external skeleton is preferably made from aluminum components due to the aluminum's resistance to rust and its relatively lighter weight than steel.

The external aluminum skeletal components of the trailer 10 include a generally angled, vertically extending front plate member 94 disposed at the front of the trailer, and a generally straight vertically disposed rear end member 95. The front end member 94 is disposed at an angle, to better aid in the dumping characteristics of the trailer. Along with being angled forwardly from vertical, the front 94 of the trailer 10 is preferably arcuate in a horizontal cross section. This horizontal arcuate nature of the front plate member 94 improves the aerodynamic characteristics of the trailer.

The aluminum external skeleton also includes a first longitudinal member 96 that includes a forward end 98 coupled to the front plate 94 and a rearward end 100 coupled to the rear end member 95. The first longitudinal upper frame member 96 extends along generally the entire length of the trailer 10, and is disposed at the top of the trailer 10. The longitudinal upper frames 96, 102, define the top most portion of the trailer 10, and serve as a dividing line between the interior of the trailer and the exterior of the trailer 10. The second longitudinal member 102 is similar to first longitudinal upper frame member 96, and extends between a forward end 104 that is coupled to the front plate member 94 and a rear end 106 that is coupled to the rear end member 95. The first and second longitudinal frame members 96, 102 are constructed generally similarly, but as mirror images of each other, and are disposed in a co-planar, parallel axis relationship, as they extend between the front plate 94 and the rear end member 95 of the trailer.

Disposed near the lower end of the bed of the trailer are the first longitudinal frame member 110 and a second longitudinal frame member 118. The first and second longitudinal frame members 110, 118 are disposed on the same respective sides as the first upper longitudinal frame member 96 and second longitudinal upper frame member 102. Each of the first and second longitudinal lower frame members 110, 118 include forward ends 112 (not shown) that are coupled to the front plate member 94; and rear ends 114 (not shown), that are coupled to the rear end member 95.

Figure 2:
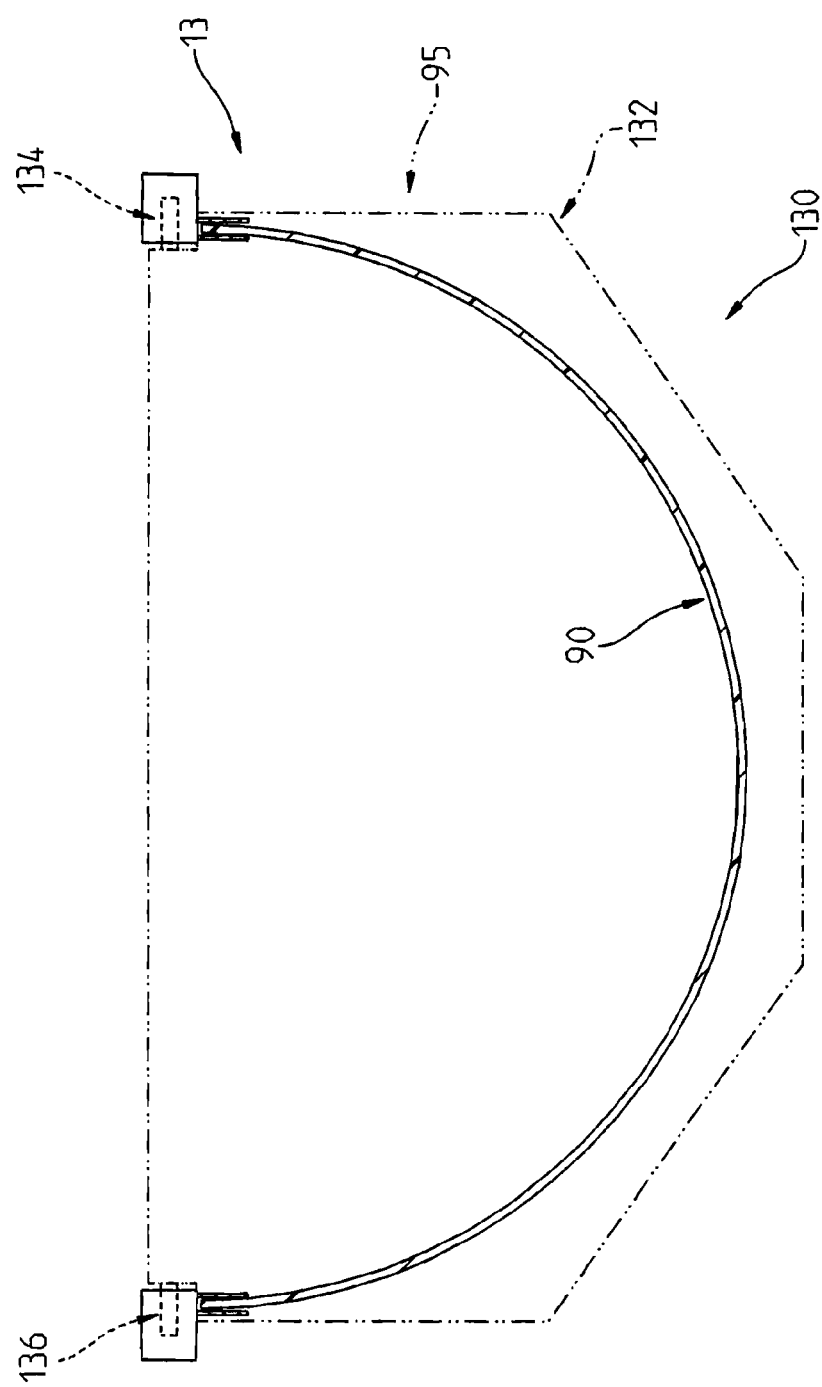
FIG. 2 is a sectional view taken along lines 2-2 of FIG. 1.

As best shown in FIG. 2, the rear end member 95 includes a stationary portion 130, that is fixedly coupled to the upper longitudinal frame members 96, 102 and lower longitudinal frame members 110, 118. A swingable gate member 132 is hingedly coupled to the stationary portion 130 and is sized to cover the open end interior of the bed, to maintain the material in the bed, when the trailer 10 is doing something other than dumping. A pair of hinge members 134, are provided for hingedly coupling the swingable gate 132 to the stationary portion 130.

The external aluminum skeleton also includes a plurality (here shown as three) circumferential bands. The circumferential bands extend between the top rails 96, 102 and under the belly of the bed. The circumferential bands are disposed in a plane that is generally perpendicular to the long axis of the trailer 10 and bed 18. The circumferential bands include a first circumferential band 138 that includes a top end connection 140, for coupling the circumferential band 138 to the top rail 96. The circumferential band 138 also includes a lower coupling 132 for coupling the first circumferential band 138 to the lower longitudinal frame member 110 and/or saddle member 162. The first circumferential band 138, is disposed at the same longitudinal (axial) position as the dolly wheel 36 assembly. This is done so that the forces that are exerted on the lower portion of the trailer 10 through the dolly wheel 36 engaging the weight of the trailer 10 when the trailer 10 is parked, will be transmitted through the circumferential band member 138. In this regard, the circumferential band member 138 provides a reinforcing member, for better handling these forces, when compared to a hypothetical situation where the dolly wheel 36 were placed in a position not directly aligned with the circumferential band member 138.

The second circumferential band 146 is placed relatively rearwardly of the first circumferential band member 138, and is disposed in a plane generally parallel to the plane in which the first circumferential band member 138 is placed. The second circumferential band member 146 includes a top end 148 for coupling the second circumferential band member 146 to the longitudinal top rail 96, and a lower coupling point 150, wherein the circumferential band is coupled to either or both of the lower frame member 142 and saddle member 162. The second circumferential band is longitudinally positioned at the same place as the rear pivot 84 of the draft arms 48. The circumferential band 146 is positioned above the pivot 84 to better absorb and transmit the loads imposed on the trailer bed 18 by the draft arms 48. The trailer 10 exerts a downward force on the hinge member 84 when the trailer is in its rest position, such as is shown in FIG. 1. When in the dump position, the weight of the trailer bed 18 and the cargo contained therein is borne to a significant degree by the draft arms 48, and is transmitted to the bed, through the pivot 84, and second circumferential band 148.

The third circumferential band 154 is disposed rearwardly of the second circumferential band 146 and forwardly of the rear gate member 95. The third circumferential band 154 includes a top portion 156 that is coupled to the top rail member 96, and a lower portion 158 that is fixedly coupled to one or both of the lower frame rail member 110 and saddle member 162. The lower end of the first circumferential rail member 138 may also be coupled to the saddle member 162.

Figure 3:
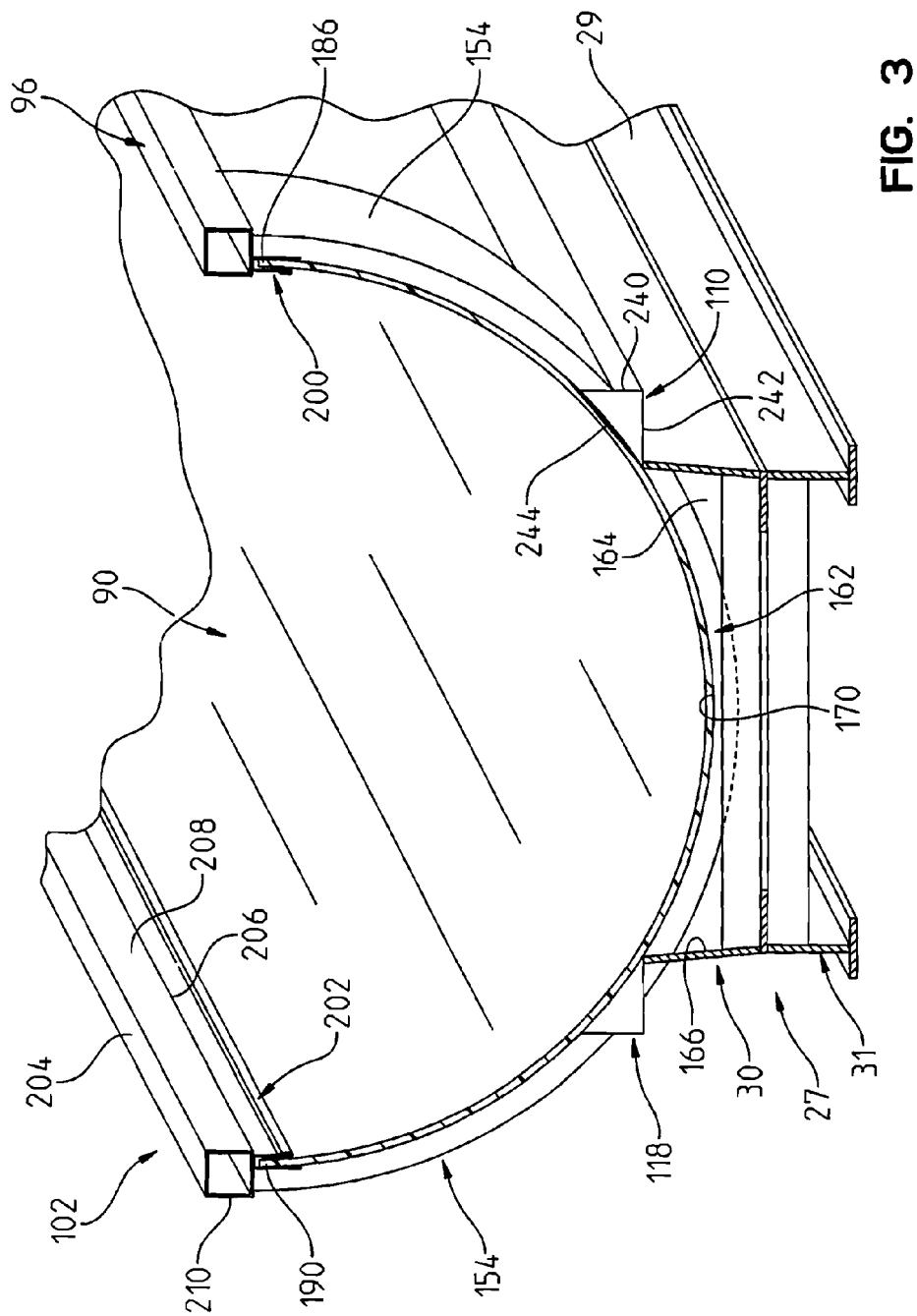
FIG. 3 is a perspective cut-away view showing the bed of a trailer.

As best shown in FIG. 3, a third circumferential band member is disposed generally close, or adjacent to the forward portion 27 of the wheel frame and suspension assembly 26. The third circumferential band member 154 is placed at this position, so that force and weight can be transferred between the bed 18 and the truck suspension frame 26.

A saddle member 162 that serves as a floor support for the bed 18 is also part of the aluminum external skeleton. The saddle member 162 extends generally the length of the trailer, and includes a first end 164 that is coupled to the front plate 94 and second end 166 that is coupled to the rear gate member 95. The saddle member 162 also includes a first side portion 172 that extends along, and is fixedly coupled to the lower frame member 110, and a second side portion 174 that extends along, and is coupled to the second lower frame member 118. An arcuate upper surface extends between the first and second side portions 172, 174 on the sides, and the first and second ends 164, 166 at its front end and rear end. The arcuate upper surface serves as a lower support member for supporting the plastic bed liner 90. Although the arcuate upper surface 170 is generally arcuate in cross section, and includes a radius that is generally similar to the 48 inch radius that defines the curve of the plastic bed liner 90, the arcuate upper surface 170 actually comprises a section of the cylinder, that one can imagine as having a plane that extends through it at 5:00 and 7:00, with the arcuate upper surface 170 comprising the portion of the cylinder between 5:00 and 7:00.

As best shown in FIGS. 1 and 3, the plastic bed liner 90 fits interiorly within the openings, (e.g. 171 that are defined as the space between the metal frame member), various components, such as the top rail members 96, 102; lower longitudinal rail members 110, 118; and saddle member 162, and is supported by these aluminum external members. The plastic bed liner 90 extends generally along the entire length of the trailer 10, and has a hemi-cylindrical shape, so as to define a semi-circle in a radial cross section.

The plastic bed member is preferably made from an extruded sheet of UHMW type plastic. The plastic if preferably formed by extrusion, in sheets that are then bent to fit the radius. Although the plastic bed 80 is shown as a single sheet, it will also be appreciated that it can be comprised of a plurality of sheets that are joined together by a suitable bonding technique, such as sonic welding, glueing, melted, etc.

The plastic of the bed 80 should preferably have a thickness of between ¼ inch and one inch. As will be appreciated, the thicker the plastic, the greater the weight of the plastic, and also the durability of the plastic. In this regard, it should be noted that there are several types of wear and tear exerted on the plastic. One type of wear and tear results from the force exerted by the weight of the materials against the plastic bed liner, that can cause the bed liner to bow outward under the weight. To a large extent, the support members and the spacing between the aluminum external support members will handle these "bowing" forces. However, it will also be appreciated that the thicker the plastic, the more resistant the plastic will be to such bending loads.

Additionally, the loading of materials into the trailer, and the sliding of cargo materials along the interior of the trailer; and more particularly, the frictional engagement between the materials in the trailer and the plastic bed, as the materials slide along the trailer when being dumped, will cause an abrasion and erosion of the bed liner. This erosion can be handled both through the choice of plastics (and their inherent erosion resistance capabilities), and also the thickness of the plastic, it being understood that the use of a thicker plastic provides more material that can erode.

The radius of the plastic bin should be a 48 inch radius. As it will be appreciated, the 48 inch radius gives the plastic bed liner 90 and hence the trailer an approximately 8 foot (96 inch) diameter.

As stated above, the preferred material for plastic bed liner 80 is ultra high molecular weight (UHMW) polyethylene. UNHW polyethylene is often referred to as the world's toughest polymer. UHMW is a linear high density polyethylene that has a high abrasion resistance as well as high impact strength. UHMW is also chemical resistant and has a low co-efficient of friction, that makes it highly effective in a variety of applications. Among those applications are the instant invention, and also in liners for truck beds.

UHMW is chose in the instant application because it is alleged to be six times more abrasion resistant than steel, to help withstand the frictional forces that would abrade and erode the bed as the cargo within the dump liner slides along the length of the dump liner as it is being dumped. Additionally. UHMW is alleged to be non-marking, non-abrasive, and to have a low friction co-efficient that aids in the sliding of the load along the length of the bed as the cargo is being dumped from the dump trailer of the present invention. Additionally, UHMW withstands wide variations in heat well and is useable between about −155 degrees Fahrenheit and 200 degrees Fahrenheit. It can also be cold bent or heat bent to make required shapes. Further, it absorbs no water, and is impervious to most chemicals. It is alleged to not chip, peel, crack or rot. Further, UHMW can be dyed various colors to thereby help to present a pleasing aesthetic package to the trailer of the present invention, and more particularly, the bed liner 90 of the present invention.

Although the term "bed liner" may be used in the present application, it should be understood that the bed liner 90 of the present invention is different than a traditional bed liner. Typically, a traditional bed liner is not necessarily a load-hearing member of the bed. Rather, it is a plastic liner that is installed interiorly of a metal bed member. As such, the liner is supported under its almost complete area.

Therefore, a traditional bed liner consists of a metal bed, and a plastic coating to the bed, or sheet member placed over the bed. The use of a typical plastic bed liner does not achieve any significant weight savings, when compared to a typical metal bed, since the bed liner comprises a member that is added to the load supporting metal bed, and therefore adds weight to the bed. In contrast, the liner 90 of the present invention is a load bearing structural member that provides a significant amount of the support and containment of the load, to thereby enable the aluminum member to comprise only a skeleton, that supports the bed liner in selected areas. Through the use of this skeletal configuration, substantial amounts of aluminum or other metal can be eliminated from the trailer, thereby reducing the weight of the trailer.

Figure 7:
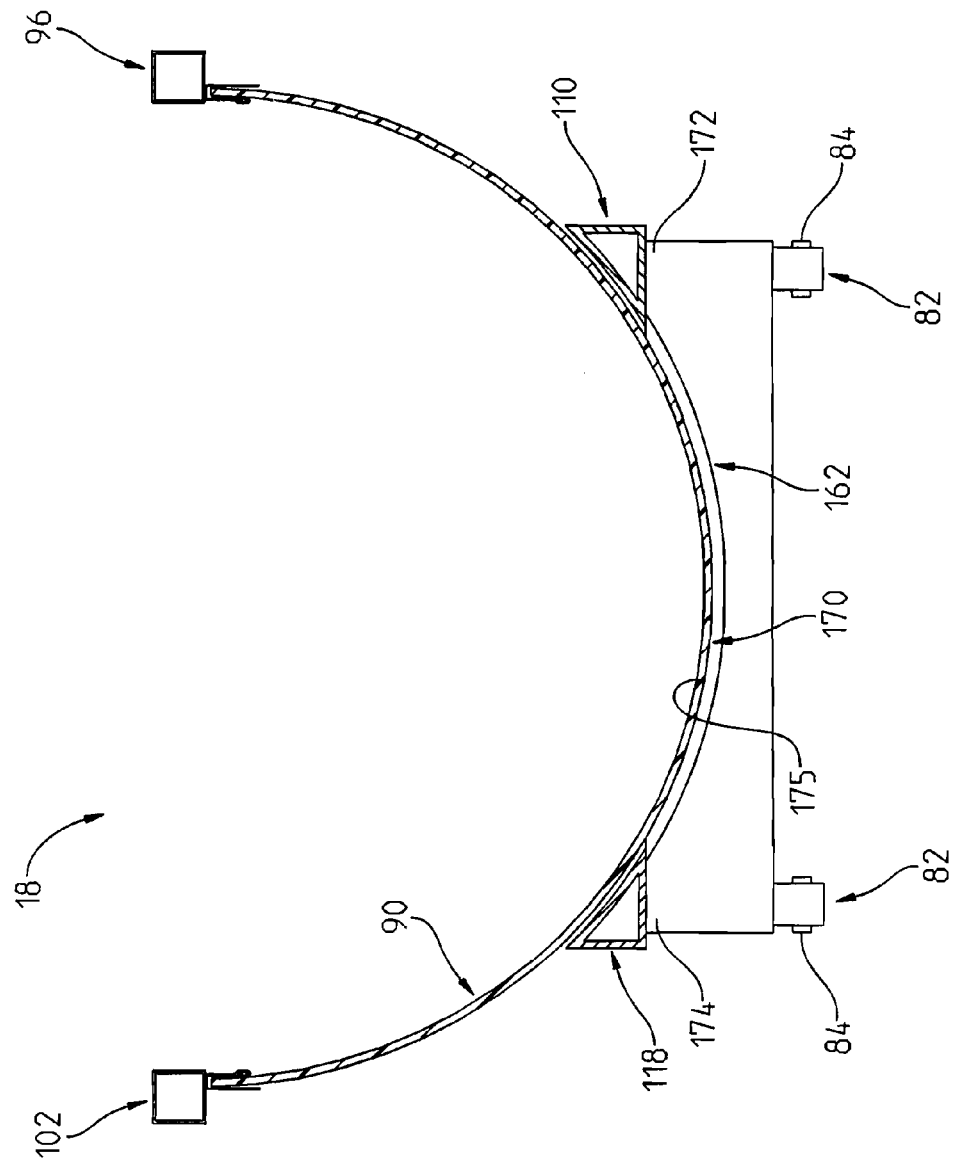
FIG. 7 is a sectional view taken along lines 7-7 of FIG. 6, showing a circumferential support and a draft arm attachment of the present invention.

The plastic bed liner member 90 includes a first end surface 180, that generally follows the contours with the lower surface of the front end member, and a second end member that generally follows the hemi-cylindrical contour adjacent to the gate, as is shown in FIG. 7. Bed member 90 also includes a first side surface 186 that is coupled to the first longitudinal rail 96, and a second side surface 190 that is coupled to the second longitudinal rail 102. A tarp 194 comprises an optional accessory, that may be draped over the open top end of the trailer 10 to help prevent the load from being subject to the elements, in particular rain and snow, and that also helps to contain lightweight loads such as grain within the trailer to keep such lightweight loads from becoming airborne and flying out of the trailer.

Figure 4:
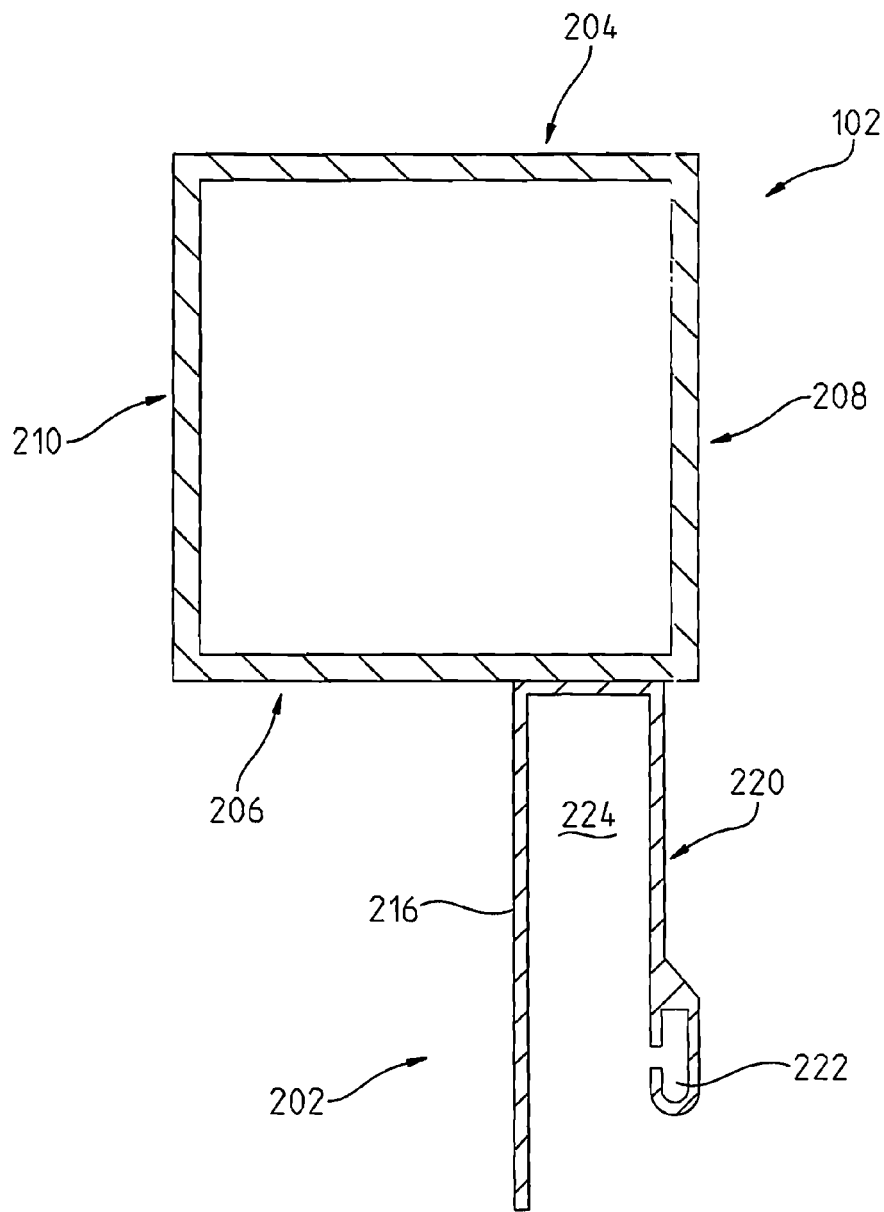
FIG. 4 is a greatly enlarged, sectional view of the top rail and liner support receiver of the present invention.

Turning now to FIG. 4, the aluminum top rail 102 and the plastic bed liner receivers 200 will be explained in more detail. A pair of plastic bed liner receivers 200, 202 are connected to, and extend along the length of the respective top rail members 96, 102. The bed liner receiver members 212 are preferably formed from an extruded aluminum, and are coupled to the respective top rail members 96, 102.

As shown in FIG. 4, the aluminum top rail member 102 comprises a box-shaped extruded member, that includes a top leg 204, a bottom leg 206, a first side leg 208 and a second side leg 210. Each of the four legs 204, 206, 208, 210 have a length of about 9 inches. The longitudinal length along the axis of the top rail is approximately 40 feet long in a 40 foot trailer. This length of course will vary depending upon the length of the trailer. The important thing to note is that the top rail 96, 109 generally extends along the entire top length of the trailer.

The aluminum receiver member 200, 202 for receiving the plastic bed liner 90 is attached, such as by welding, to the bottom leg 208 of the aluminum top rail member. This liner support 202 can also be co-extruded with the top rail member 102. As an extruded piece, the cross sectional shape shown in FIG. 4 is generally maintained along the entire length of the liner support member 202. The liner support 202 includes a relatively longer exterior leg member 216 and a relatively shorter interior leg member 220, that define a liner receiving channel 224 therebetween. The liner receiving channel 224 has a depth that is between 5 inches long (as defined by the exterior member) and 4 inches long (as defined by the interior member 220). A T-shaped receiving track 222 is formed at the lower end of the interior leg member 220.

The width of the channel should be approximately 1.125 inches across. Although it would appear that one could get away with using an exterior leg 216 and interior leg 220 that were shorter than the respective 5 inch and 4 inch legs used, the dimensions do hold some importance. In particular, the length of the channel 224 should be great enough to withstand the radial contraction that will occur in the plastic bed liner as a function of temperature.

In this regard, it is believed that the plastic of the bed liner of the UHMA polyethylene used will shrink or grow by approximately 1 inch per 10 feet of length. As the width of the bed liner comprises essentially one-half of a circle having 48 inch radius, the half circumference of this circle should be generally equal to the measured distance of the bed liner between the first side surface 186 and second side surface 190. As the bed liner 90 has a 48 inch radius, the measured length between the first side surface 186 and the second side surface 190 of the bed liner should be approximately 150 inches, or about 12.5 feet. Since the plastic is expected to grow by a factor of about 1 inch per 10 feet of length, it will be expected that this 12.5 feet of distance between the first side surface 186 and 190 will result in somewhere between 1 and 1.5 inches of growth and shrink size.

This growth can be accommodated by sizing the plastic bed member so that when cold, the top of the first and second side surfaces 186, 190 (See FIG. 4B) does not reach the top of the support member to leave some space S, between the two of at least 1 to 1.5 inches or so, so that during expansion, the bed liner can "expand" into space S.

Figure 4A:
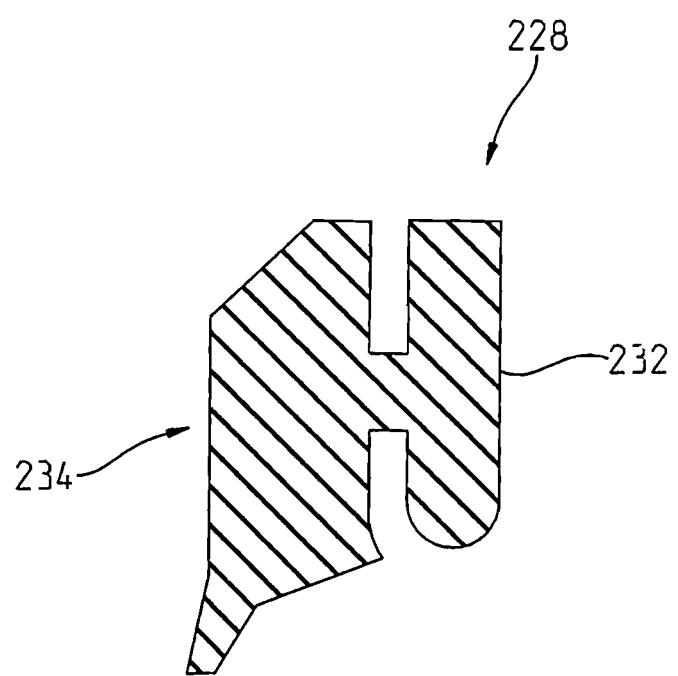
FIG. 4A is a rubber seal member useable with the liner support of the present invention.
Figure 4B:
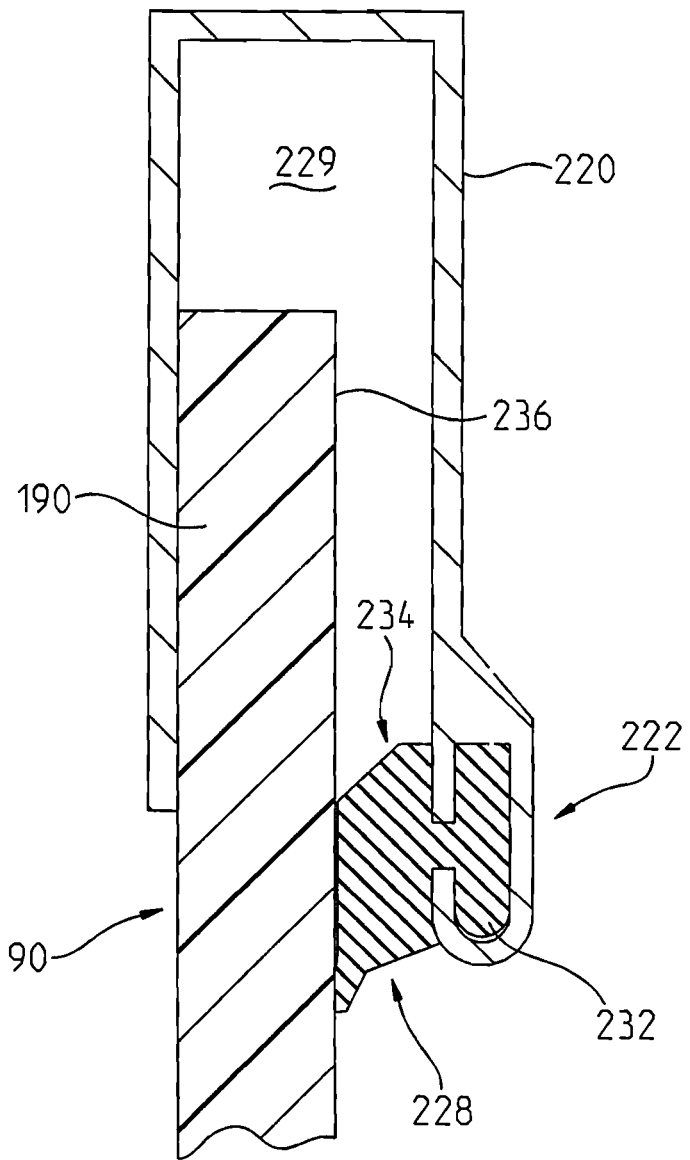
FIG. 4B is a sectional view of the rubber seal assembled into the liner support of the present invention.

As shown in FIGS. 4A and 4B, the T-shaped receiving track 222 is sized for receiving the T-shaped track engaging portion 232 of the seal. The liner engaging portion 234 of the seal 228 extends into channel 224, and engages the interior side surface 236 of the plastic bed panel liner 90. This engagement between the seal 228 and the surface 236 provides a water and dirt tight seal, to prevent water, dirt, corrosion and other undesirable materials from becoming resident in the channel 224. This seal 228 also helps to prevent moisture from becoming resident in the channel 224. The rubber seal 228 should be of a sufficient softness to deform under the engagement of the plastic member 236. In other words, the seal 228 should be softer than the plastic bed liner 90, so that the seal 228 deforms to a greater extent than does the hard UHMW polyethylene plastic member 90.

Turning now to FIG. 2, it will be noted that the bed liner 90 has a generally half-round shape. This shape is constant generally between the back and the front of the trailer. Turning now to FIG. 3, a good cross sectional view of the lower longitudinal supports 110, 118 are shown. It will be noted that they are triangular in cross section with a vertical leg 240, a horizontal leg 242, and a generally arcuate upper hypotenuse leg 244 to receive a generally arcuate bed member 90.

Figure 5:
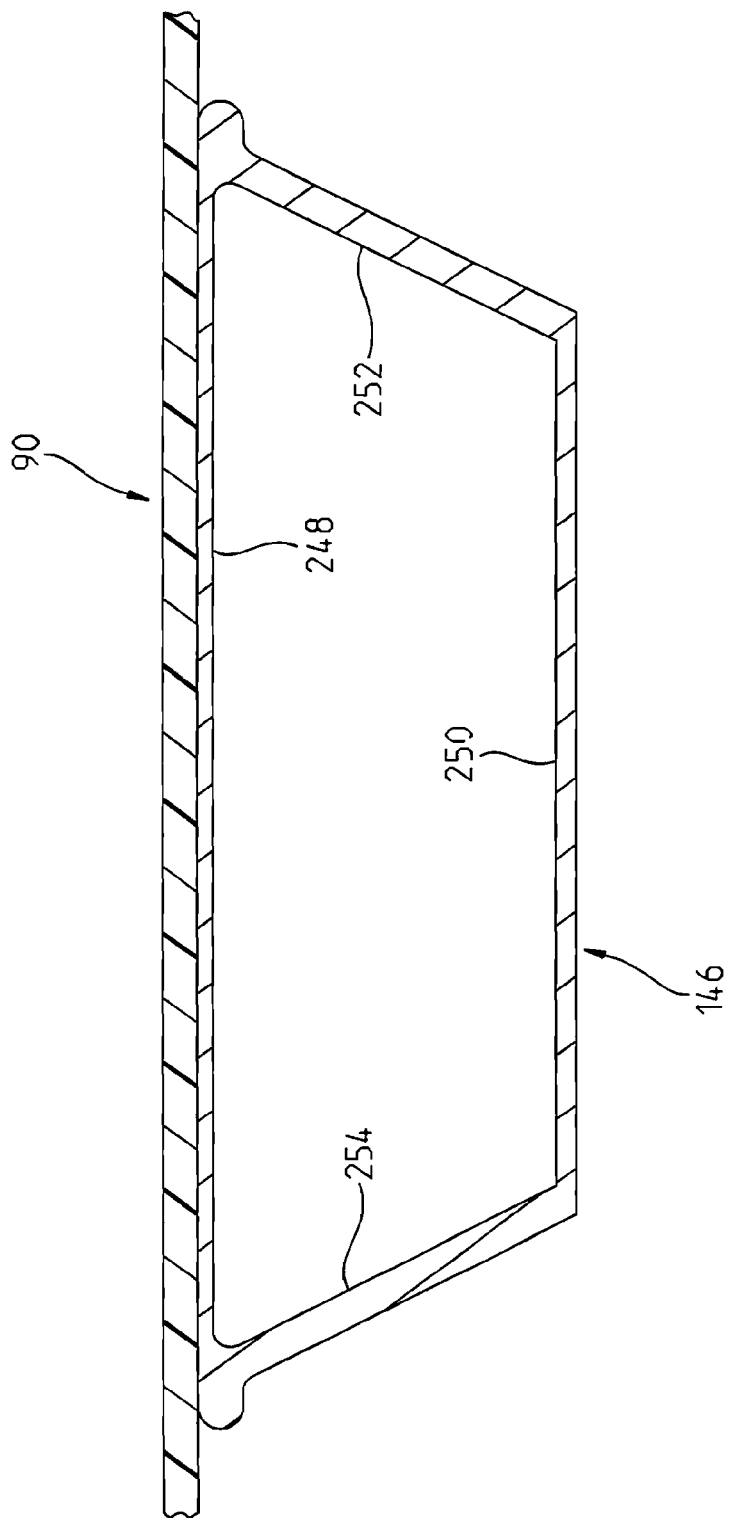
FIG. 5 is a sectional view taken along lines 5-5 of FIG. 1, showing a circumferential support member of the present invention.
Figure 6:
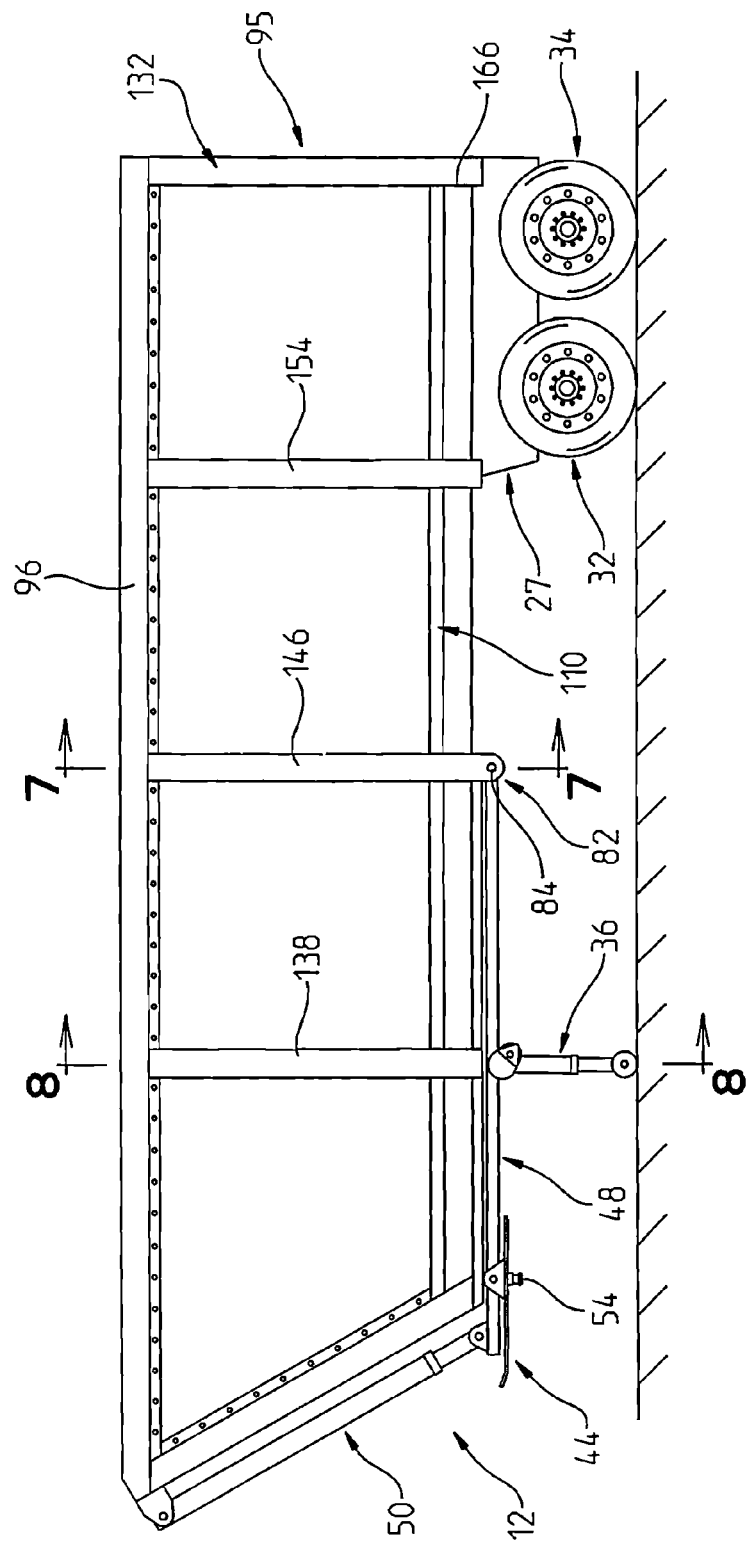
FIG. 6 is a side view of the trailer, generally somewhat similar to FIG. 1.

In FIG. 5, a sectional view of the second circumferential support member 146 is shown. The circumferential support member 146 is a quadrilateral tube-like member having a interior bed liner 90 receiving leg 248, a first side leg 252, and a second side leg 254. The circumferential support member 146 comprises a bent extrusion, and is designed so that the interior and exterior legs 248, 250 have a thickness of approximately 3/16 inch; and a first and second side legs 252, 254 have a thickness of approximately 1/4 inch.

Figure 8:
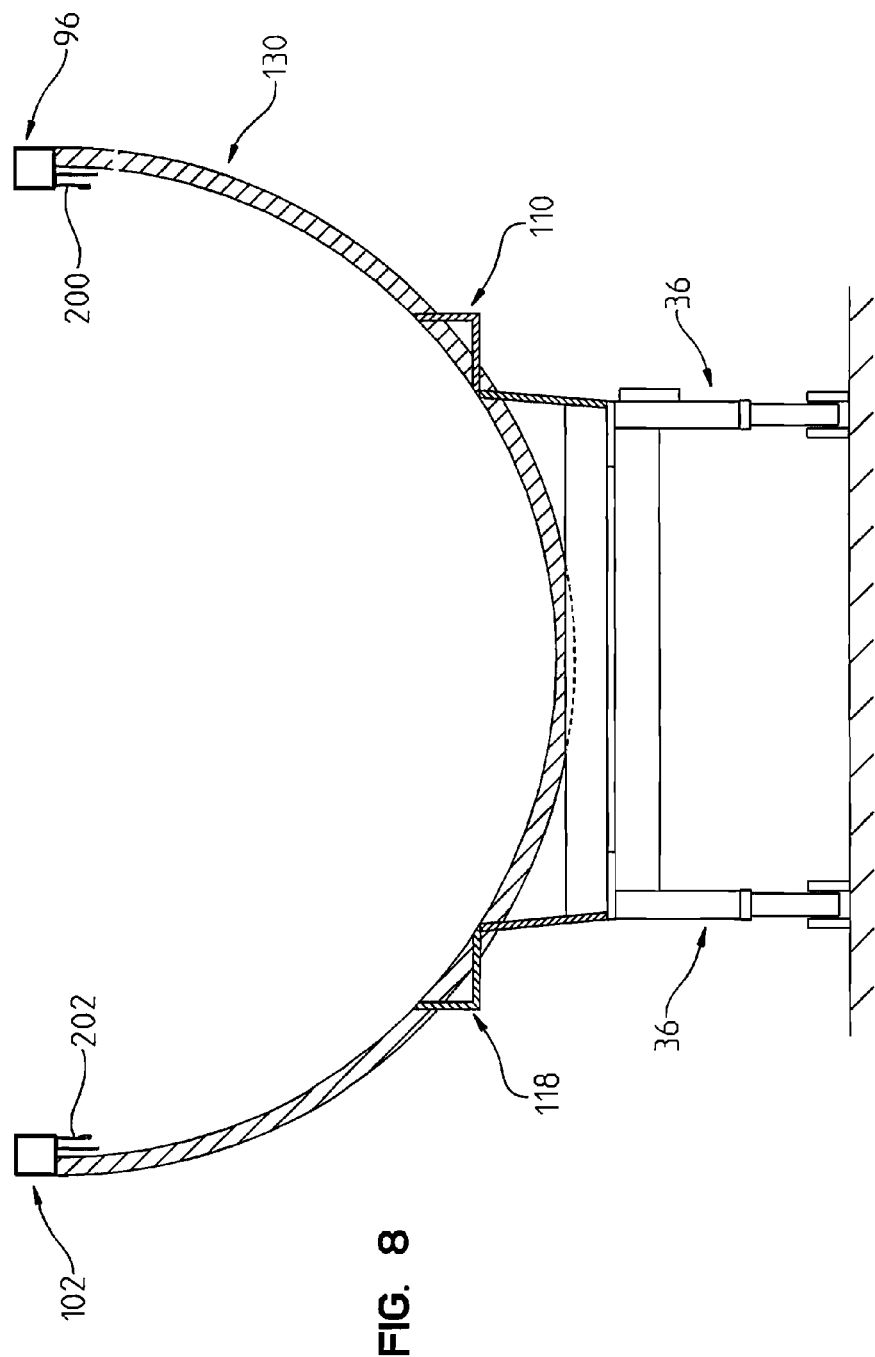
FIG. 8 is a sectional view taken along lines 8-8 of FIG. 6, showing a circumferential support and dolly legs of the present invention.
Figure 9:
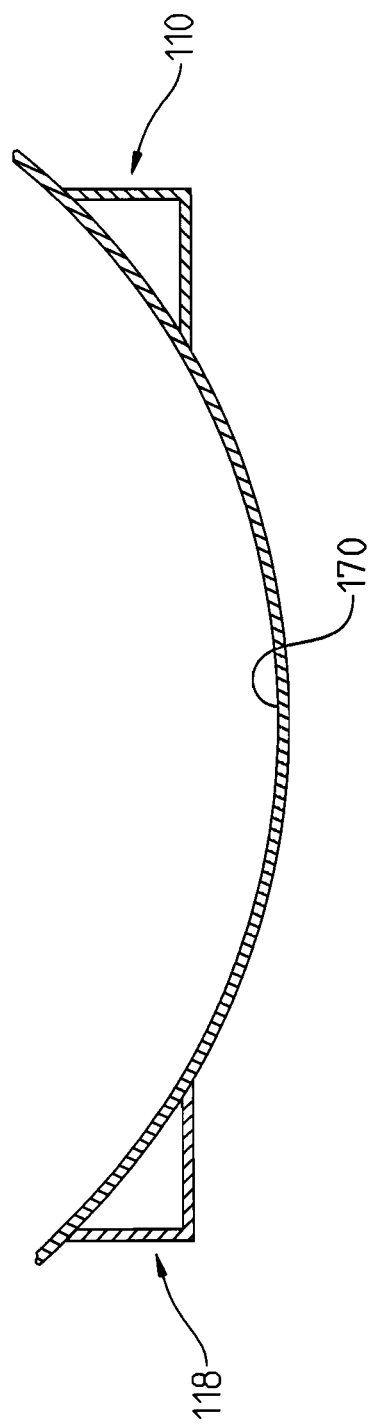
FIG. 9 is a sectional view of the floor and lower side rail of the present invention.

FIG. 7 illustrates the hemi-cylindrical nature of the "round bottom" bed, and the relationship between the various parts, such as the bed liner 90, the top rails 96, 102, and the pivot members 84 of the draft arms. FIG. 8 shows a sectional view similar to FIG. 7, but taken at a longitudinal point of the trailer at the first circumferential member, and the dolly leg 36. FIG. 9 is a highly schematic view of the saddle member 170, and the lower longitudinal frame members 110, 118.

An alternate embodiment square (or rectangular) bottom trailer is shown in FIGS. 10-24. The trailer 1010 of the present invention is shown in the figures as comprising a square bottom, rectangular cross sectional dump-type trailer 1010. A square dump trailer is so named because in cross-section, the trailer has a rectangular shape with a generally planar bed floor. The trailer 1010 includes a first or front end 1012, and a second or rear end 1014. The primary components of the trailer 1010 comprise a bed assembly 1018, that comprises the cargo holding portion of the trailer 1010, and the various supporting structures associated therewith. The second primary component is the lift assembly 1020 and the third primary component is the suspension/wheel and assembly 1022. The lift assembly 1020 comprises those components whose purpose it is to move the bed 1018 between its rest position (shown in the figures) wherein the bed is generally disposed parallel to the ground; and a lift position (not shown) wherein the front end 1012 of the trailer 1010 is raised relative to the rear end 1014, so that a load contained within the bed 1018 will slide rearwardly and hopefully, out of the back end gate of the trailer 1010.

The suspension/wheel assembly 1022 is disposed generally at the second (rear) end 1014 of the trailer 1010, and includes the suspension for the trailer 1010, and the ground-engaging wheels 1032, 1034 on which the trailer 1010 rides. The suspension/wheel assembly 1022 includes a suspension frame 1027 that has a forward portion disposed generally forward of the tandem wheels 1032, 1034 and a rear portion 1029 disposed generally close to the rearwardly disposed gate member. The suspension frame 1027 includes a first and a second sub-frame members that are shown in more detail in FIG. 1. The first and second sub-frame members 1030, 1031 are preferably welded, or otherwise fixedly coupled to the underside of the bed assembly 1018.

A suspension member, that can be identical to those discussed above in connection with the round bottom trailer, is coupled to the suspension frame 1026. The axles include brakes and tire engaging assemblies to which the tires 32, 34 are coupled. The ground engaging tires 1032, 1034 are shown in a "tandem axle" configuration.

Another wheel set that is fixed to the trailer comprises dolly wheels 1036. The dolly wheels 1036 extend downwardly from bed assembly 1018. The dolly wheels 1036 include a telescopically mounted, ground engaging portion 1038. The relative length of the dolly arm 1036 can be adjusted, by moving the telescopically adjustably positionable, ground engaging member 1038.

The lift assembly 1020 includes three primary components including the front platform 1044, draft arms 1048 and a hydraulic (or pneumatic) lift cylinder 1050. The front platform 1044 is part of the trailer to tractor coupling mechanism of the trailer 1010, and includes a downwardly extending king pin 1054, that is received by a fifth wheel receptacle of a tractor, to pivotably couple the tractor (not shown) to the trailer 1010. The front platform 1044 includes a pivotal coupling mechanism 1056 for pivotably coupling the first (lower) portion of the draft arms 1048 to the upper surface of the front platform 1044. The front platform 1044 also includes a second pivotal coupling member 1057, for pivotably coupling the lower end 1062 of the hydraulic cylinder 1050 to the upper surface of the front platform 1044.

The hydraulic cylinder 1050 includes the lower end 1062 and an upper end 1066. The upper end 1066 includes a pivotal coupling 1068, for pivotably coupling the upper end 1066 of the cylinder 1050, to a frontal frame member 1072, that is disposed at the upper end of the front surface of the trailer bed 1018.

The cylinder 1050 may be either a hydraulic, pneumatic, or electro-mechanical cylinder. Cylinder 1050 is movable between its collapsed position, and an extended position. In the collapsed position, such as is shown in FIG. 1, the telescoping members within the cylinder 1050 are in their collapsed orientation, so that the trailer bed 18 is lowered to a position where it is generally parallel with the road surface on which the trailer rests.

In the raised position, the telescoping member of the cylinder 1050 is fully extended, so that the forward end 1012 of the trailer bed 1018 is raised upwardly relative to the platform 1044, and the rear end 1014 remains planted upon the ground surface. This places the trailer bed 1018 at a forward up/back down angle, wherein the force of gravity can cause loads contained within the bed 1018, to move from the front 1012 of the trailer 1010 to toward the rear 1014 of the trailer, and preferably out the gate 1095 of the trailer. Concurrently with the movement of the cylinder 1050 from its rest position (FIG. 1) to its dump position (not shown), the forward end 1058 portion of the draft arms 1048 pivots relative to the front platform member 1044 about pivot member 1056. Additionally, the rear end 1082 of the draft arms 1048 are pivotably coupled by pivot 1084 to a frame member of the trailer 1010 that is disposed underneath the trailer bed 1018. This pivotal coupling the draft arms 1048, and the forward platform 1044, and the trailer bed 1018, enables the trailer bed 1018 to pivot backwardly and upwardly to its dump position.

The parts mentioned above are common to all four embodiments of the trailers shown in the drawings. To the extent that such features are not shown in the drawings for one or more of the embodiments, they are presumed to exist, in a form generally similar to the form shown in FIG. 10. To the extent that such common parts are shown, they will be given similar numbers.

Figure 10:
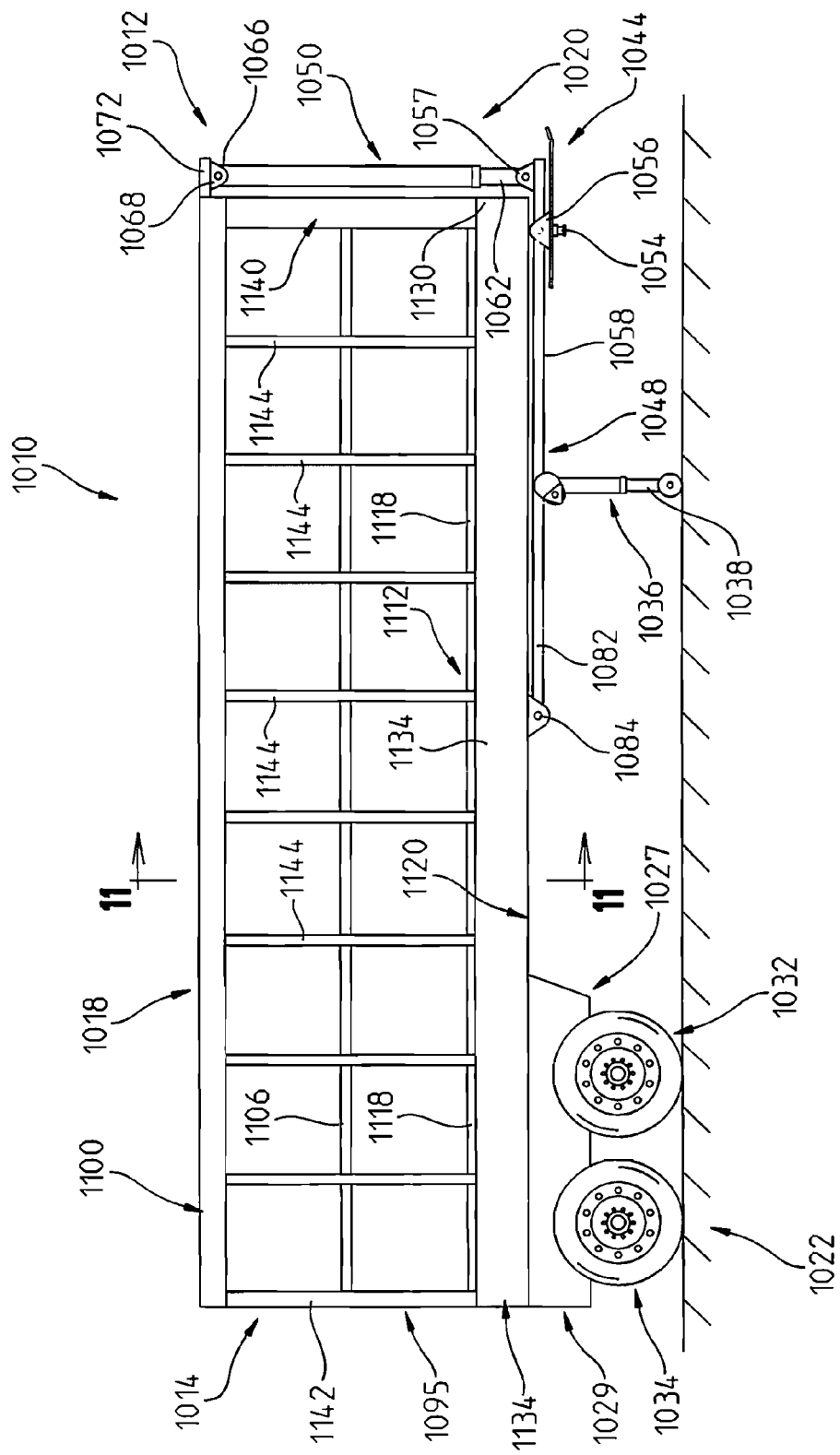
FIG. 10 is a side view of a first embodiment of the composite trailer invention of the present invention, showing an externally disposed rail version.
Figure 11:
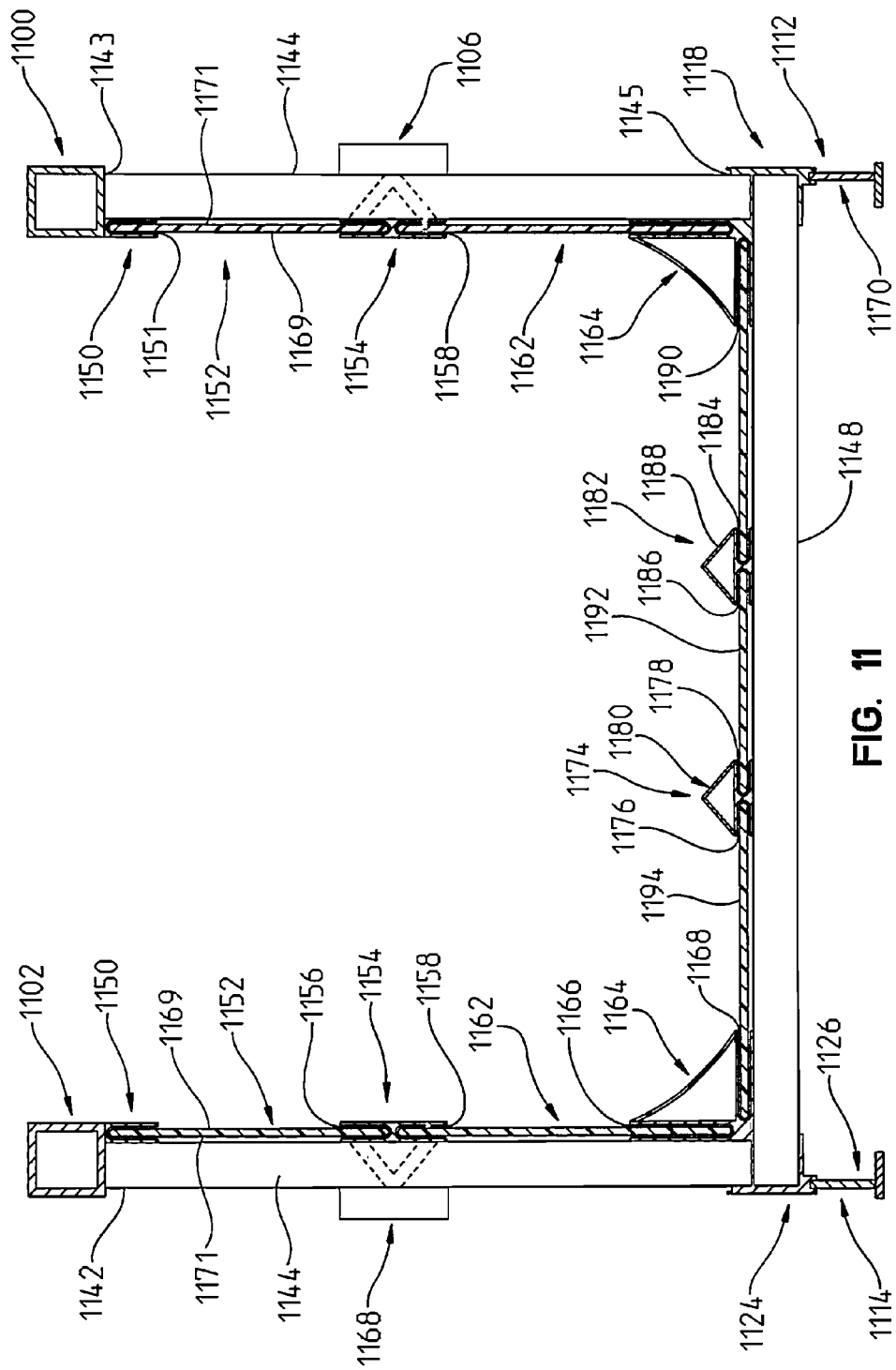
FIG. 11 is a sectional view taken along lines 2-2 of FIG. 1.
Figure 12:
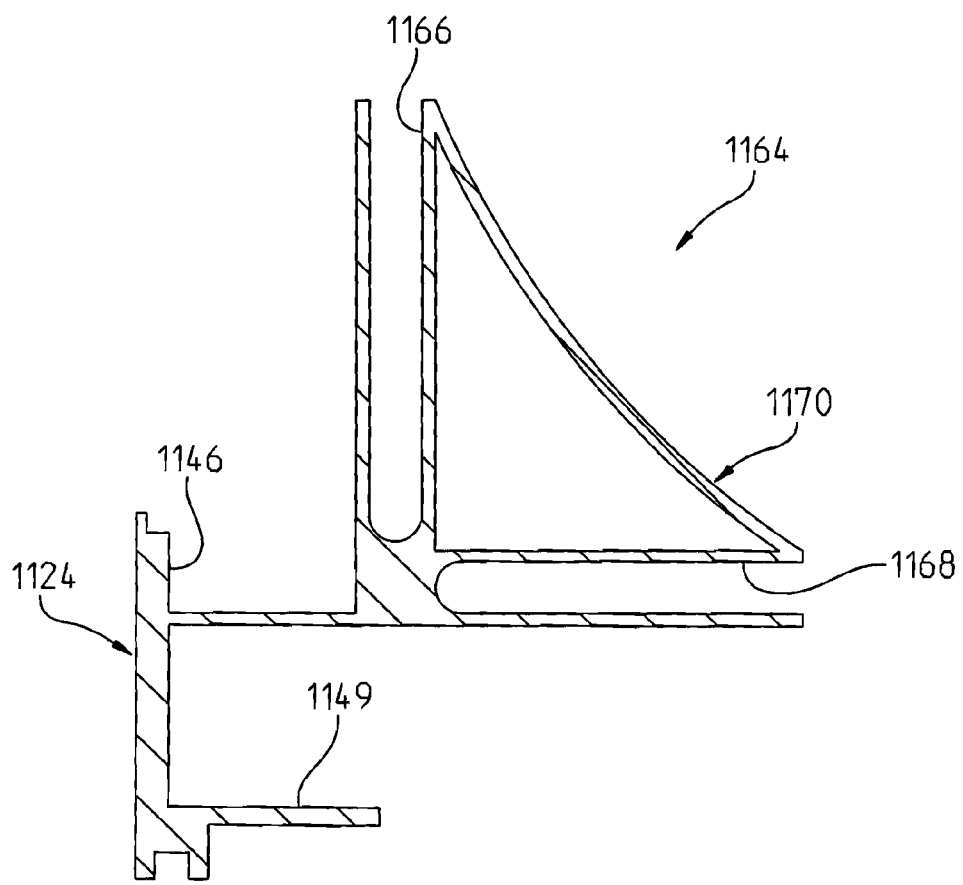
FIG. 12 is an enlarged sectional view of a corner bracket of the first embodiment external rail version.
Figure 12A:
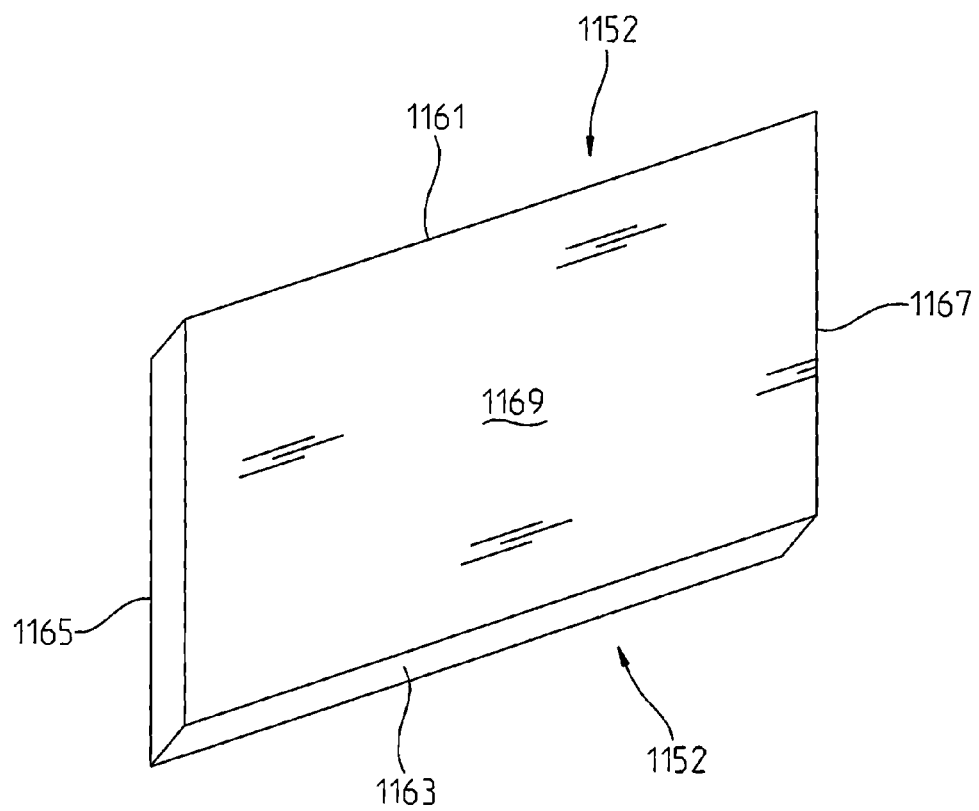
FIG. 12A is a perspective view of an illustrative panel member used in connection with the composite panel trailer of the present invention.
Figure 13:
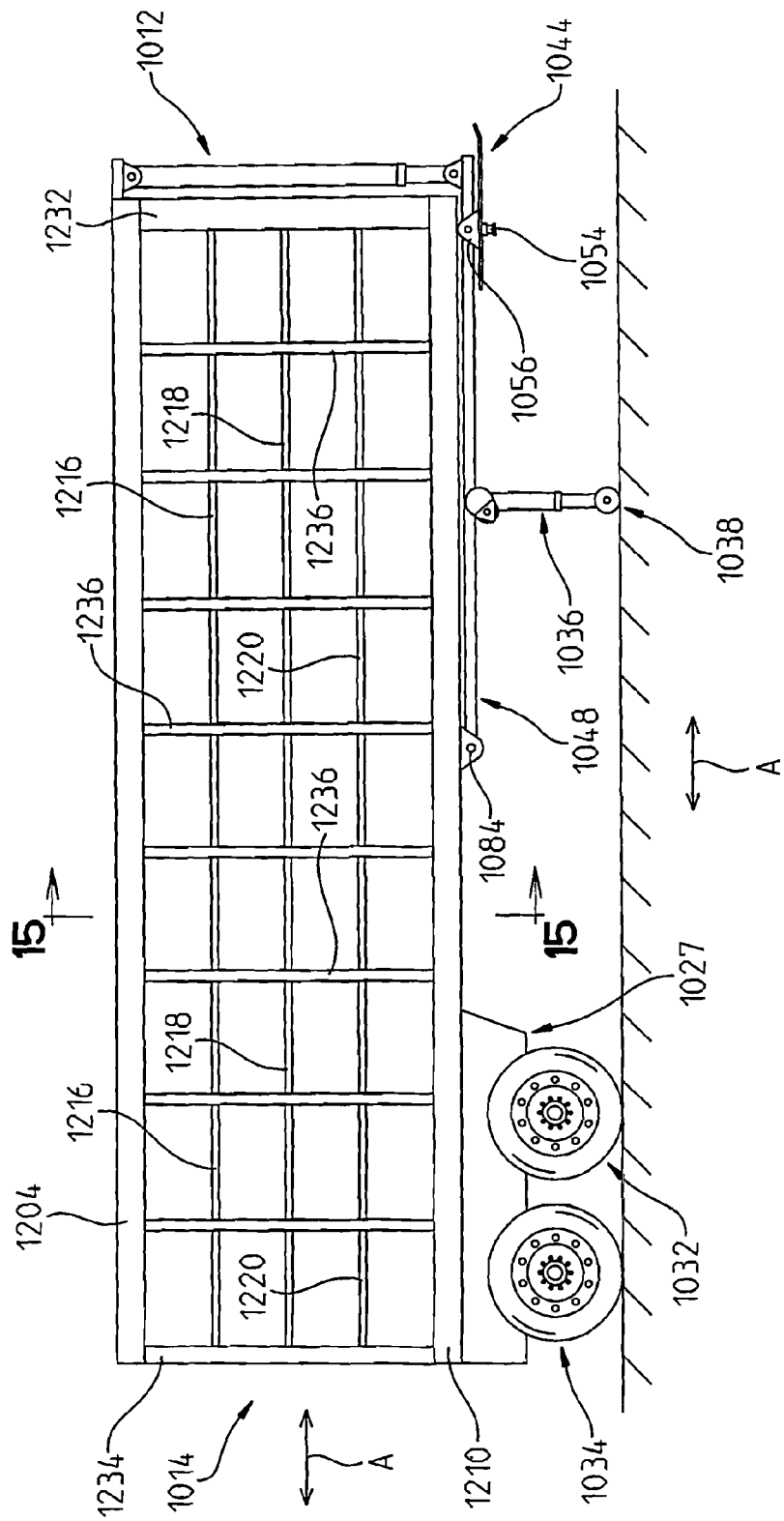
FIG. 13 is a side view of an alternate embodiment "corrugated panel" composite trailer of the present invention, employing corrugated plastic panels.

The readers attention is now directed to FIGS. 10-12, that show the first embodiment of the trailer 1010. First embodiment trailer 1010 has generally relatively internally disposed flat panels, and relatively externally disposed skeletal frame members.

Trailer 1010 includes a first, longitudinally extending top rail member 1100, and a second longitudinally extending top rail member 1102. First and second top rail members 1100, 1102 extend along the respective right and left top edges of the trailer, and extend generally between the front 1012 and rear 1014 of the trailer, along an axis A, generally parallel to the normal direction of travel of the trailer 1010 (see FIG. 1).

The trailer 1010 also includes a first longitudinally extending mid-positioned (or belt) rail 1106, and a second longitudinally extending mid-positioned or belt rail 1108. The belt rails 1106, 1108 also extend longitudinally exteriorly on the trailer 1010 between the first end 1012 and the rear end 14. Whereas the top rails 100, 102 extend generally along the top edge of the trailer, the middle rail portions are vertically positioned generally half way between the top rails 1100, 1102 and the longitudinally extending bottom rail assemblies 1112, 1114. The first and second longitudinally extending belt rails 1106, 1108 provide structural rigidity to that portion of the composite panels midway between the top rails 1100, 1102 and bottom rails 1112, 1114.

First and second longitudinally extending lower rail assemblies 1112, 1114 extend longitudinally along the respective right and left sides of the trailer. The first longitudinally extending lower rail assembly 1112 is disposed on the same side of the trailer as the first longitudinally extending top rail 1100; and the same is true with respect to the second longitudinally extending top 1102 and bottom 1114 rails. The first longitudinally extending lower rail assembly 1112 includes a first lower rail member 1118 that is disposed generally at the bottom of the panel portions, and a first arched frame support member 1120. Similarly, the second longitudinally extending lower rail assembly 1114, includes a second lower rail member 1124 and a second arched lower support member 1126.

As shown in FIG. 10, the first arched frame support member 1120 has a forward end 1130, a rearward 1132 and a middle portion 1134. When viewed from above, the support member 1120 is arched in a convex manner, so that the middle portion 1134 extends above each of the forward and rearward ends 1130, 1132. This arch is incorporated into the design, so that the support member 1120 will be arched when the trailer is empty, but will flatten out under a load, when the trailer is filled with its cargo, such as dirt, coal, scrap metal and the like. This arched structure is designed to better accommodate the load, without sagging or bottoming out.

The trailer 1010 also includes a plurality of posts, that extend generally between the top rails 1100, 1102, and the bottom rails 1118, 1124. The vertical support posts also intersect, and engage the middle belt rail members 1106, 1108. The vertical posts include a front or forwardly most positioned vertical support post 1140, a rearwardly most disposed vertical support post 1142, and a plurality of intermediate vertical support posts 1144, that are evenly spaced between the front and rear vertical posts 1140, 1142. The front support post 1140 can be formed as a part of the front panel of the trailer 1010, and the rear vertical support post 1142 can be formed as a part of the rear or tail portion of the trailer. With respect to the rear portion, it will be appreciated that the rear portion of the trailer 1010 includes a swingably open gate member, to enable the load to be dumped out of the trailer. As such, the rearward vertical support post is preferably not a part of the gate, but fixedly positioned to provide structural support for the side members of the trailer. The gate, should be independently moveable of the rear vertical support post.

As the front support member of the trailer does not include a gate, the front vertical support post can be a part of either the side panel or the front panel, and is preferably part of both, as it forms the intersection therebetween.

Each of the top rails 1100, 1102; middle belt rails 1106, 1108; bottom rail assemblies 1112, 1114 including their component lower rail members 1118, 1124 and frame support members 1120, 1126 are preferably formed from an extruded metal, as are the vertical support posts 1140-1144. Preferably, all of the above mentioned components are made from an extruded aluminum, as aluminum is both strong and significantly lighter than steel, thus tending to produce a more light-weight trailer than would be possible to achieve with steel. As is best shown in FIG. 11, the top end 1143 of the vertical support posts 1144 are coupled to the top rail member, such as top rail members 1100, 1102. The bottom portion 1145 of the side rail post 1144 is received by a side post support pocket 1146, that comprises an upwardly opening pocket formed in the side rails 1118, 1124, respectively, of the lower rail assemblies 1112, 1114.

As is best shown in FIG. 11, a plurality of floor cross members 1148, extend between the two rail members 1118, 1124. The floor cross members 1148 are spaced at generally even intervals, along the length of the trailer, and extend in a direction generally transverse to the direction of travel of the trailer 1010. The cross members 1148 are fitted to extend within cross member receiving pockets 1149, that are formed as a part of the lower rail members 1118, 1124 of the lower rail assemblies 1112, 1114. As alluded to above, the pockets and panels are sized to accommodate thermal expansion and contraction.

Coupled to the top rail members 1102, 1100, is an upper panel receiving member 1150 that includes a pocket 1151 for receiving the upper edge of an upper side panel 1152. Upper side panel 1152 is shown in FIG. 3A as comprising a generally rectangular, generally planar panel member 1152. The panel member 1152 includes a generally linear top edge 1161 and an opposed, generally linear bottom edge 1163. The panel also includes a first side edge 1165 and a second side edge

1167. A large interiorly facing planar surface 1169 is provided for facing interiorly within the trailer, and a generally planar exterior surface 1171 is provided for facing outwardly toward the vertical posts 1144.

The remaining panels discussed below in the trailer are shaped generally similar to panel 1152, and include the same general side edge portions, planar interior surface, and planar exterior surface. The primary difference between panel 1152 and the other panels, if any, will likely reside in the particular dimensions of the panels, including different lengths, different widths, and, perhaps different thicknesses to accommodate different loads.

The lower edge 1163 of the side panel 1152 is sized and configured for being received within the upwardly opening pocket 1156 of the mid-post panel receiving member 1154. Mid-post panel receiving member 1154 extends generally between the front and rear of the trailer, and is positioned generally in an opposed relation to and parallel with the mid-rail or belt portion 1108, 1106 respectively.

The mid-rail panel supporting post 1154 also includes a lower pocket 1158, for receiving the upper edge of the lower side panel 1162. Lower side panel 1162 is generally similar in configuration to upper side panel 1152, and also includes a lower end, that is received in an upwardly opening vertically disposed pocket 1166, that is formed in the lower panel receiver 1164. Lower panel receiver 1164 extends generally along an axis parallel to the direction of travel of the trailer 1100, and is disposed adjacent to the lower side rail members 1118, 1124. Optimally, the lower panel receiver 1164 is formed to be a part of the lower rail member 1124. Preferably, the receiver 1164 and rail 1124 can be extruded as a one piece extrusion; or otherwise, is securely coupled to the lower side rail 1124.

The lower panel receiving member 1164, includes a horizontally inwardly opening pocket 1168, and an arcuate corner portion 1170 in addition to the above-discussed vertically opening pocket 1166. The arcuate corner portion 1170 is provided for giving a rounded, lower corner to the interior bed of the trailer. The horizontally inwardly opening pocket 1168 is provided for receiving one of the first 1190 or third 1194 plastic floor panel members. In particular, each of the horizontally opening pockets 168 are provided for receiving the relatively outer edge of the first or third 1190, 1194 plastic panel members.

A first floor panel receiver and positioner 1174 extends generally longitudinally in a direction generally parallel to the direction of the travel of the trailer, between the front end of the trailer and the rear end of the trailer within the bed 118. The first floor panel receiver 1174 includes a first, horizontally, outwardly opening pocket for receiving the relatively inwardly disposed edge of the third composite panel 1194, and a second horizontally inwardly opening pocket 1178 for receiving the relatively leftwardly disposed edge of the third or middle plastic floor panel 1192.

Additionally, the first floor panel receiver 1174 includes a triangularly-shaped crown portion 1180, that extends above the panel portions 1190, 1192, 1194, and is shaped to help form the pockets 1176, 1178 into which the panel members 1194, 1192 are inserted, and also to help reduce the amount of dirt and debrie that is inserted into the pocket.

A second floor panel receiver member 1182 extends generally parallel to and spaced from the first floor receiving panel 1174. The second panel receiver 1182 includes a first horizontally outwardly opening pocket 1184 for receiving first floor composite member 1190, and a second horizontally inwardly opening pocket 1186 for receiving the third plastic panel member 1192. The second floor panel receiving member 1182 also includes a triangularly shaped crown 1198.

The first 1190, second 1192, and third 1194 floor panel members are disposed generally adjacent to each other, in a co-planar relationship. The floor panel members 1190, 2192, 1194 are shaped generally similarly to the plastic panel member 1152, shown in FIG. 3A. As alluded to above, the floor panel members 1190, 1192, 1194 may have dimensions that are different from side panel member 1152, and possibly, different from each other. Nonetheless, they all share a commonality, in that they are made from plastic, and all generally comprise extruded sheets, even though the sheets may be of different thicknesses.

A second embodiment trailer 1200 is shown in FIGS. 13-18. The second embodiment trailer 1200 comprises a trailer that employs corrugated or fluted panel sheets, rather than the generally planar panel sheets shown in the first embodiment trailer 1010. Trailer 1200 includes a first longitudinally extending top rail 1204 and a second longitudinally extending top rail 1206. The first and second top rails 1204, 1206 extend generally parallel to each other at the top of the side walls of the trailer, and extend generally between the front and rear of the trailer.

Additionally, the trailer includes first and second 1210, 1212 longitudinally extending bottom rail assemblies. The first and second longitudinally extending bottom rail assemblies 1210, 1212 are disposed generally parallel to each other and are disposed respectively, on the first and second sides of the trailer, to extend generally between the front and rear of the trailer.

The first and second longitudinally extending bottom rail assemblies 1210, 1212 include first lower longitudinally extending lower rail portion 1222 (of first longitudinally extending bottom rail assembly 1210). The second longitudinally extending bottom rail assembly 1212 includes a second longitudinally extending lower rail member 1226. The first longitudinally extending bottom rail assembly also includes a first lower arched support member 1226. The first lower arched support member 1226 is generally similar to the respective arched support member of the first trailer embodiment 1010. The second longitudinally extending bottom rail assembly 1212 also includes a second lower arched support member 1228 that extends generally parallel with, and is generally similarly configured to, but a mirror image of, the first lower arched support member 1226.

The trailer 1200 also includes a series of vertical posts for providing vertical support. The vertical support posts include a front vertical post 1232, disposed adjacent to the front end of the trailer, a rear vertical post 1234, disposed adjacent to the rear end of the side wall of the trailer, and adjacent to the gate of the trailer. A plurality of intermediate vertical posts 1236 are disposed at generally evenly spaced intervals between the front vertical post 1232 and the rear vertical post 1234. The front vertical post 1232, rear vertical post 1234 and intermediate vertical post 1236 are all disposed generally parallel to each other, and are also disposed generally perpendicular to the top 1204, 1206 and the bottom 1210, 1212 longitudinally extending rail members.

The various rail members 1204, 1206, 1210, 1212, 1216, 1218, 1220, 1222, 1224, 1226, 1228, 1232, 1234 and 1236 comprise the skeleton of the trailer 1200, to provide structural support thereto. These various rails and posts are all comprised preferably of extruded metal members, such as extruded aluminum members. As discussed in connection with the first trailer embodiment 1010, the metal members are preferably constructed of aluminum, because it is both strong, and significantly lighter in weight than steel. Nonetheless, steel members can used in place of aluminum.

The skeletal members serve as a skeleton for providing support for a plurality of plastic panel members, that extend between, and are supported by the various metal structural members.

Figure 15:
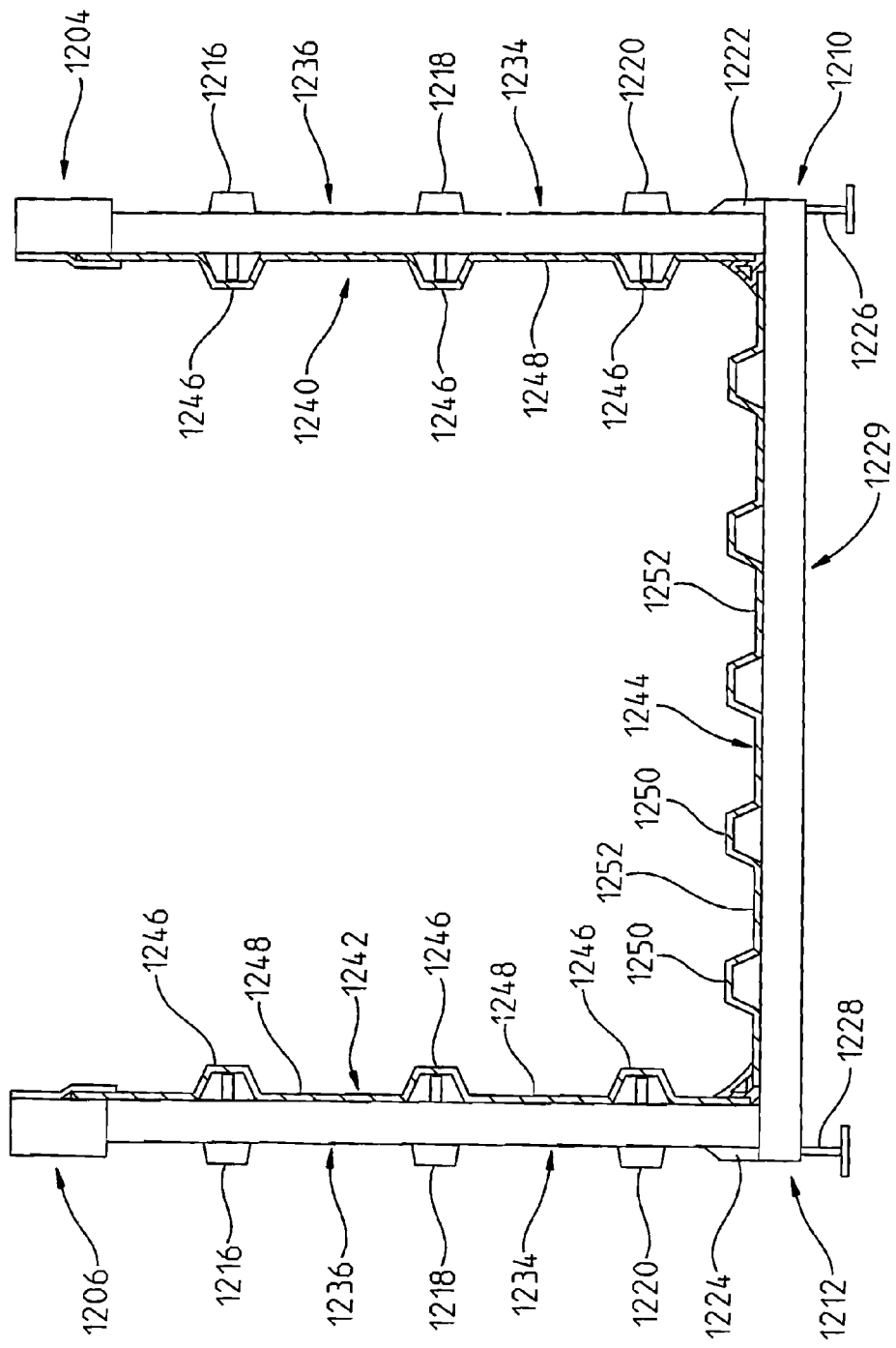
FIG. 15 is a sectional view taken along lines 6-6 of FIG. 13.

As best shown in FIG. 15, the side panel members include a first side panel member 1240 that is disposed generally vertically, and extends along the first side wall of the trailer; a second side panel member 1242, that is generally vertically disposed, and extends along the second side of the trailer, and a floor panel member 1224 that is generally horizontally disposed, and extends along the floor of the member, and is supported by one or more floor cross members 1229. Floor cross members 1229 are also preferably comprised of extruded aluminum members, and extend along an axis that is generally perpendicular to the axis of the bottom rail assemblies 1210, 1212, and also perpendicular to the axis of the vertical post members 1234.

The side panels 1240, 1242 generally comprise unitary side panels that extend between the top rail 1206 and the bottom rail 1212 portions of the trailer. It will be appreciated that a segmented side panel can also be used. It will further be appreciated that one or more side panels may be employed along the length of the trailer, and that even if side panels 1240, 1242 are used that extend between the top rails 1204, 1206 and bottom rails 1210, 1212, the side panels need not extend all the way from the front of the trailer to the rear of the trailer in a single unitary piece.

The side panels 1240, 1242, it will be noted that they are not planar. Rather, they include a series of spaced, trapezoidal, longitudinally extending flutes 1246. The trapezoidal flutes cause the panel to have a fluted portion that is disposed relatively inwardly from the valley portions 1248 that extend between the adjacent trapezoidal flutes 1246. The trapezoidal flutes are provided for enhancing structural rigidity of the side panel members. As will be appreciated, a panel having flutes, such as the trapezoidal flutes 1246 of the side panel, is less subject to bending than a planar (non fluted) panel. This increased rigidity may reduce the need for structural support, when compared to the flat panel flute.

Additionally, the floor panel 1244 also includes a plurality of trapezoidal flutes 1250, having a plurality of valley portions 1252 disposed between adjacent trapezoidal flutes 1250. Generally, the floor panel 1244 includes the trapezoidal flute for the same reason as does the side panels 1240, 1242, namely, to provide enhanced structural rigidity of the floor panel 1244.

Figure 16:
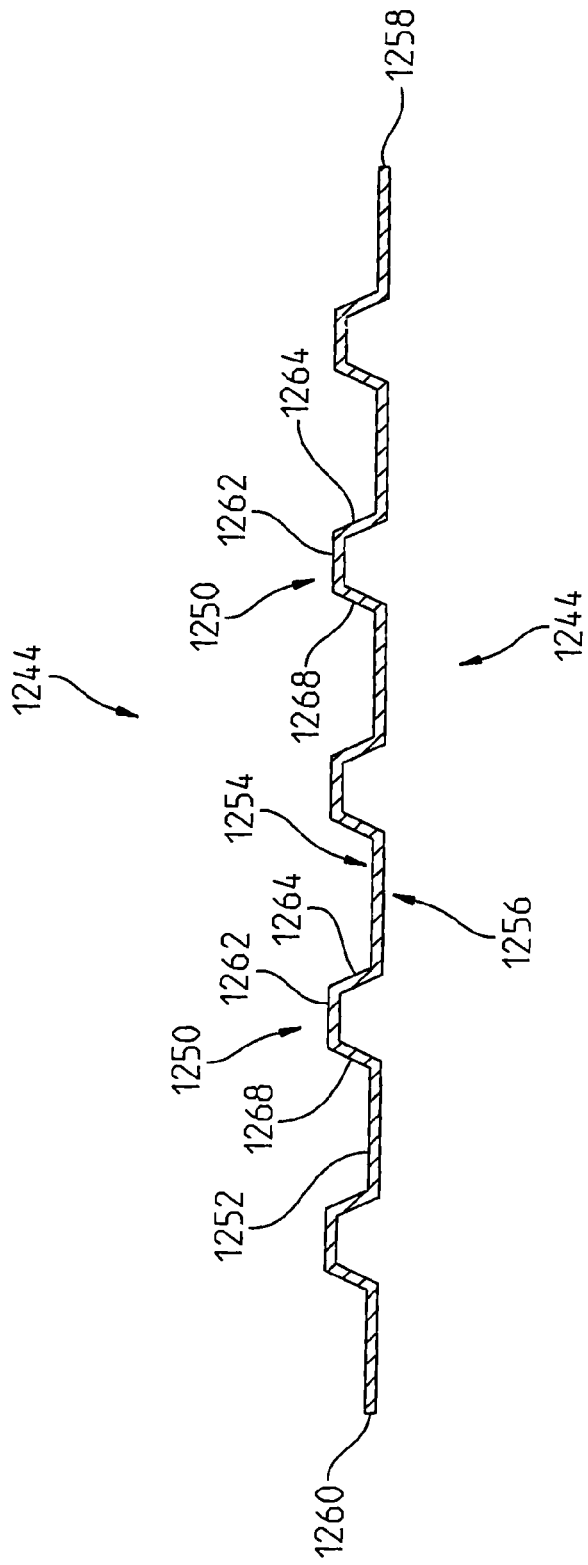
FIG. 16 is a sectional view of a portion of a corrugated panel of the embodiment of FIG. 13.
Figure 17:
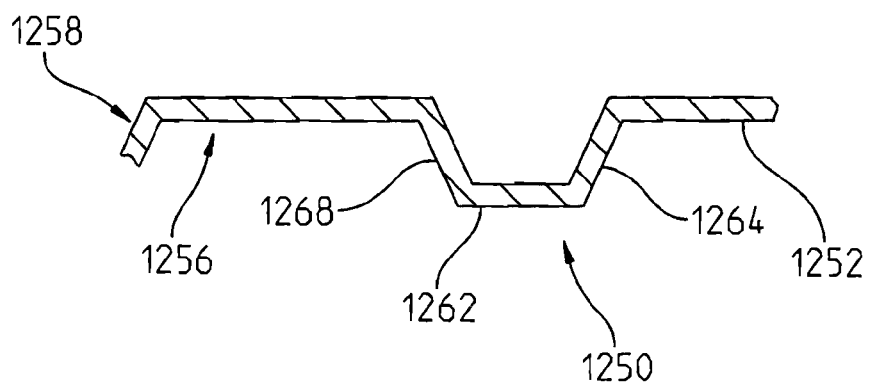
FIG. 17 is an enlarged, partially sectional view of the corrugated panel of the trailer of the embodiment of FIG. 13.
Figure 18:
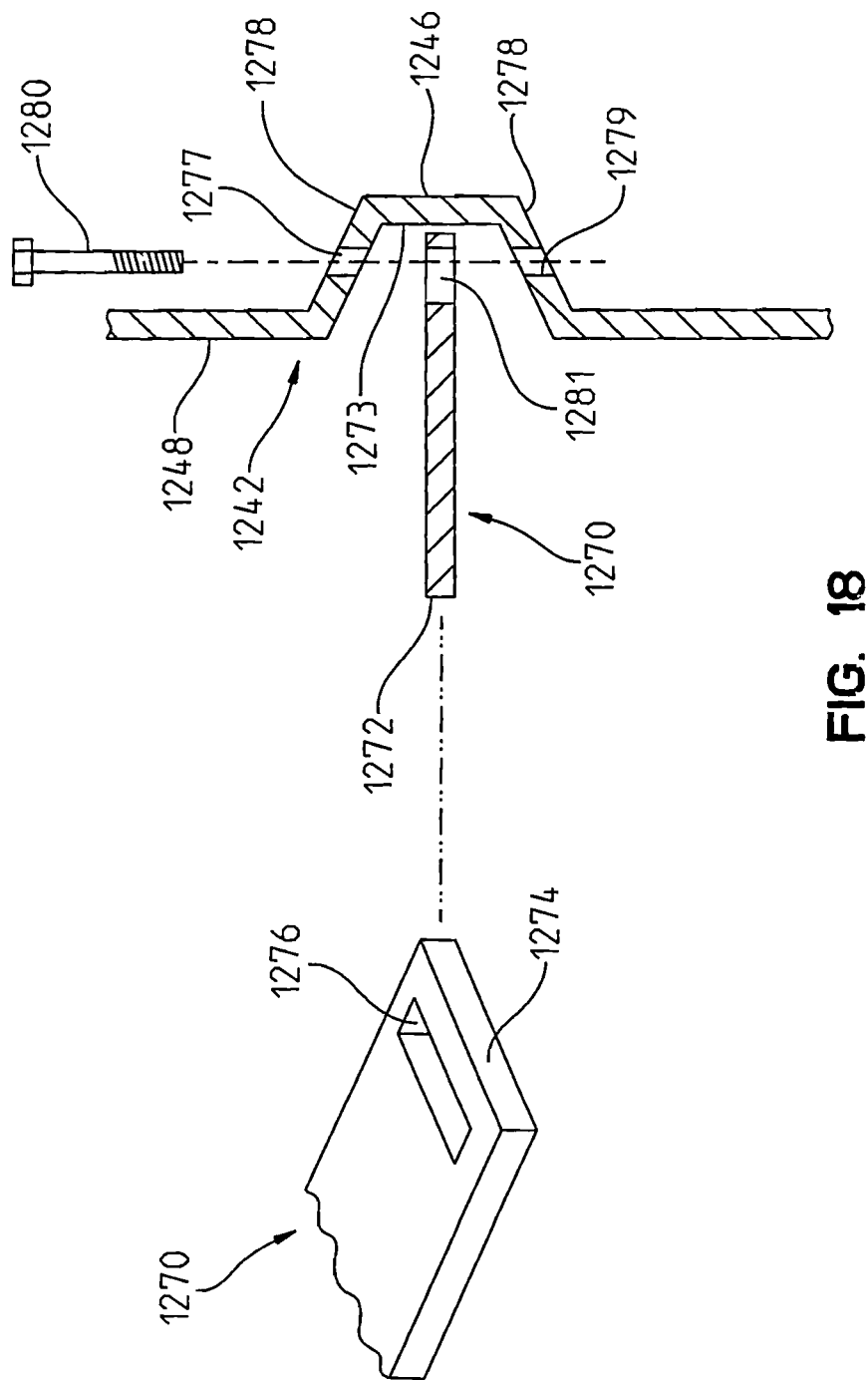
FIG. 18 is an enlarged sectional version, partly broken away of the panel clamping member of the embodiment shown in FIG. 13.

As best shown in FIGS. 16 and 17, the floor panel 1244 includes an upper surface 1254, a lower surface 1256, a first side edge portion 1258 and a second side edge portion 1260. The flutes 1250 each include a generally horizontally disposed plateau portion 1262, a first angled vertical portion 1264 disposed on a first side of the horizontal plateau portion 1262, and a second angled vertical portion 1268 that is disposed on the second side of the horizontal plateau portion 1262.

In the drawings, the flutes are shown as being truncated isosceles trapezoids, that are lacking the fourth surface that would be generally parallel and opposed to the horizontal plateau portion 1262. The flutes are arrayed in a generally evenly spaced relationship and extend generally along the length of the panel 1244. In FIG. 17, the various dimensions of the flutes are shown.

Figure 14:
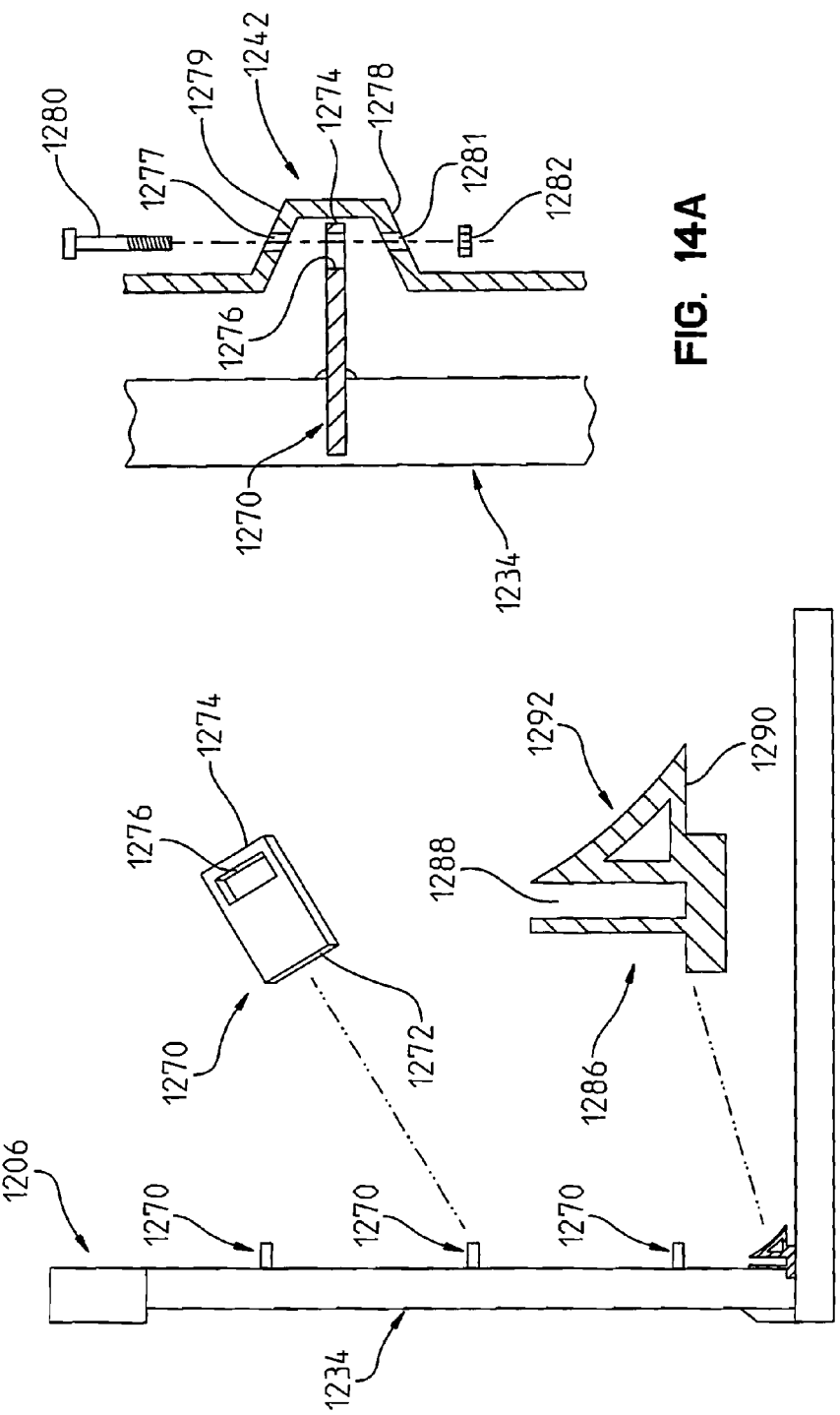
FIG. 14 is a partial, sectional view of the trailer of the alternate embodiment of FIG. 13.

Turning now to FIGS. 14 and 16, the various hardware members are shown for securing the panels to the aluminum support members.

Figure 19:
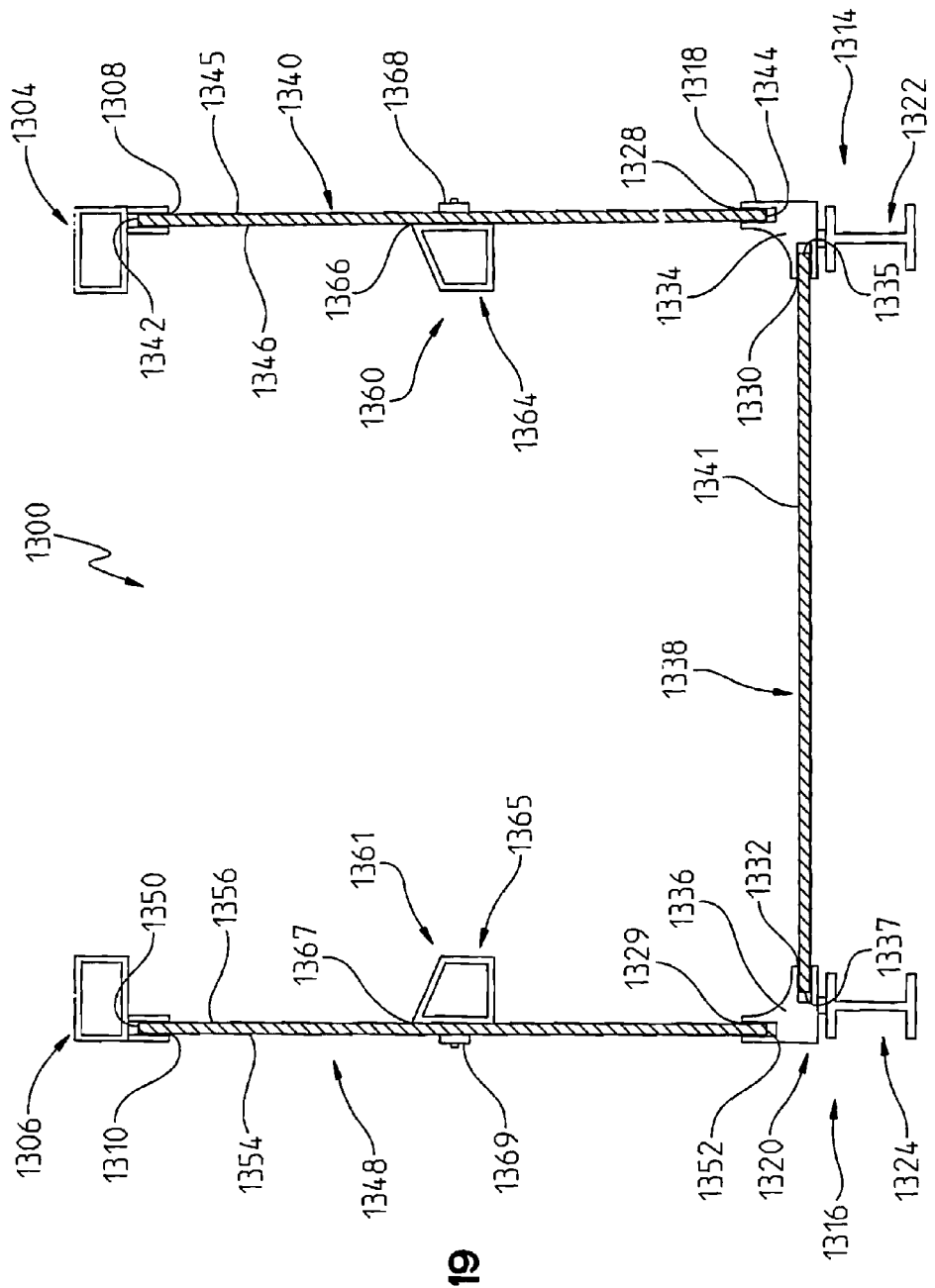
FIG. 19 is an end view of an alternate embodiment internal rail, flat panel version of the present invention.
Figure 20:
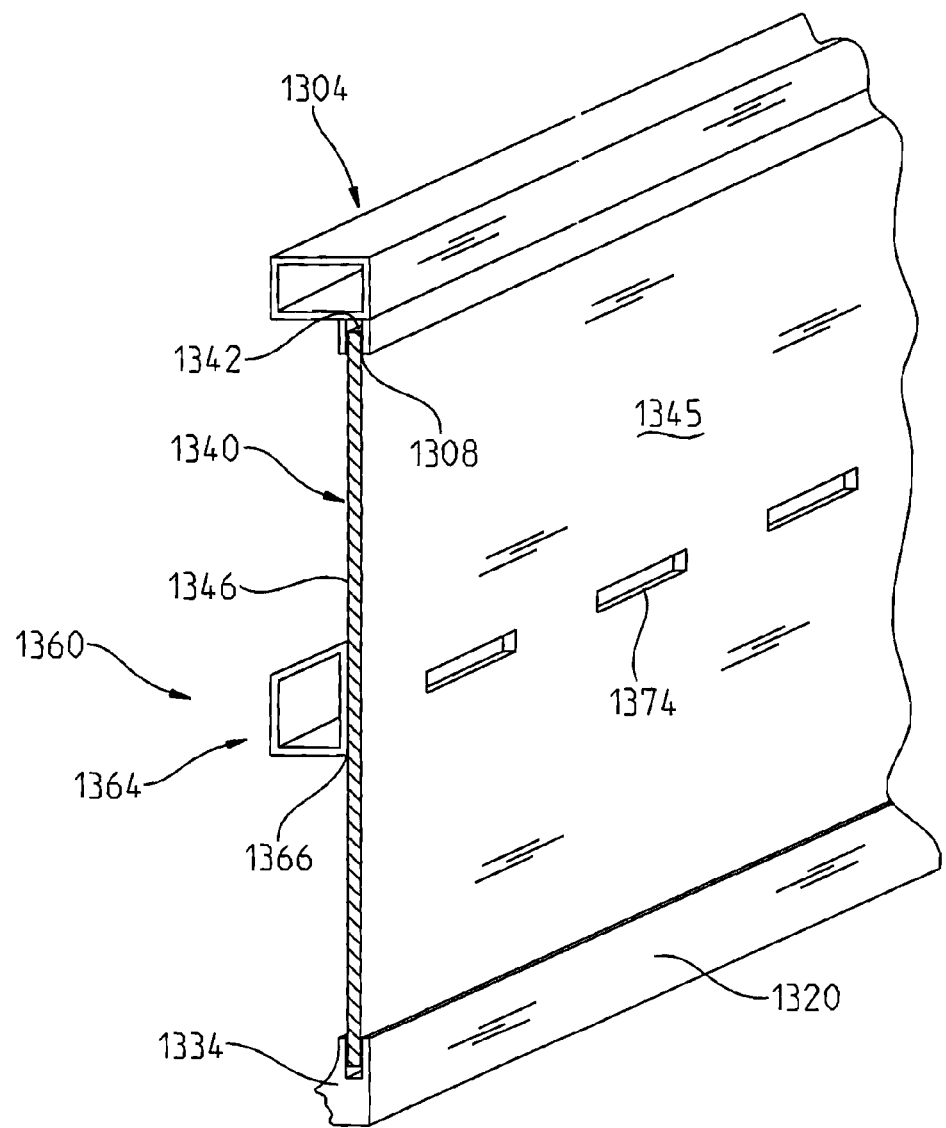
FIG. 20 is a perspective view of a panel segment of the trailer shown in FIG. 19.
Figure 21:
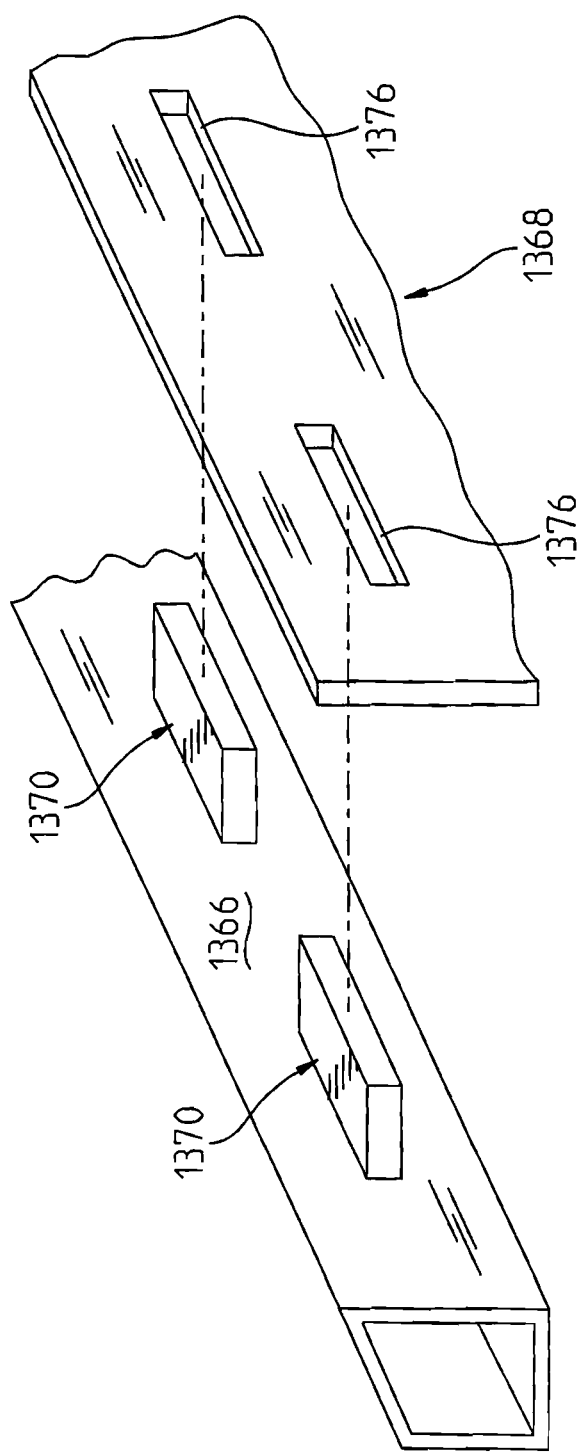
FIG. 21 is an enlarged view of a panel attachment segment of a panel of the trailer of FIG. 19.

A third embodiment composite trailer 1300 is best shown in FIGS. 19-21. Third embodiment trailer 1300 uses generally planar panels, and skeletal members that are disposed generally interiorly of the trailer, rather than exteriorly, as is shown in the trailer of FIG. 10. Third embodiment trailer 1300 includes first and second top rails 1304, 1306 that extend parallel to each other, and extend respectively along the right and left sides of the trailer 1300, between the front of the trailer 1300 and the back of the trailer 1300. The first and second panels 1304, 1306 include, respectively, first and second panel receiving pockets 1308, 1310 for enabling the top rails 1304, 1306 to interiorly receive the top edges 1342, 1350 respectively, of the first and second side panels 1340, 1348. The first and second panel receiving pockets 1308, 1310 open vertically downwardly.

The trailer 1300 also includes first and second bottom rail assemblies 1314, 1316. First bottom rail assembly 1314 includes a first bottom rail 1318, and a first arched support member 1322. As discussed above, the first arch support member 1322 is arched, so that the first and second ends (forward and rearward ends) of the support member 1322 are disposed generally lower than the middle portion of the arch support member 1322 when the trailer is empty. This is so designed so that when a load is placed within the trailer 1300, the load will cause the arch support member 1322 to flatten out under the load.

Similarly, the second bottom rail assembly 1316 includes a second bottom rail 1320 and a second arch support member 1324. As will be appreciated, the first and second bottom rail assemblies 1314, 1316 are essentially mirror images of each other.

The first bottom rail 1318 and second bottom rail 1320, include upwardly opening pockets 1328, 1329 for receiving respective lower edges 1344, 1352 of the first and second panel members 1340, 1348. Additionally, the first and second bottom rail members 1318, 1320 include horizontally opening pockets 1320, 1322, for receiving the first edge 1335 and second edge 1337 respectively, of the floor panel member 1338. The first and second bottom rail members 1318, 1320 also include arcuate transition surfaces 1334, 1336 to form an arcuate transition between the interior surfaces 1346, 1356 of the side panel members and the interior surface 1341 of the floor panel member 1338.

The first side panel member 1340, extends generally between the top rail 1304 and the bottom rail 1318, and includes an upper edge 1342 and a lower edge 1344, along with an exteriorly disposed surface 1345 and an interior surface 1346. The second side panel 1348 also extends between the top rail member 1306 and the bottom rail member 1320, and includes an upper edge 1350, a lower edge 1352, an exterior surface 1354, and an interior surface 1356.

The mid rail assembly of the device includes a first mid rail assembly 1360 and a second mid rail assembly 1361. The first mid rail assembly 1360 is coupled to the first panel 1340, and the second mid rail assembly 1361 is coupled to the second panel 1348.

The first mid rail assembly 1360 includes a first, interiorly disposed box-shaped mid rail member 1364, and the second mid rail assembly 1361 includes a second, internally disposed box rail shaped mid rail member 1365. The first and second mid rail members 1364, 1365 include respective outwardly facing surfaces 1366, 1367 that are placed against, and adjacent to the interior surfaces 1346, 1356 of the respectively first and second panel members 1340, 1348. First and second sheet like exteriorly disposed external rail members 1368, 1369 are placed opposite to, and on the exterior surfaces 1345, 1354 of the respective panels 340, 348. The exteriorly disposed rail members 1368, 1369 extend generally parallel to the interiorly disposed mid rail members 1364, 1365, and extend generally along the entire length of the trailer.

Securement and attachment members 1370 (FIG. 21) are welded to the exteriorly facing surfaces 1366, 1367 of the interiorly disposed mid rail member 1364. The securement and attachment members 1370 extend outwardly from the exteriorly facing surfaces 1368 and are sized and positioned to extend through apertures 1374 in the panel 1340, and apertures 1376 in the exterior rail members 1368, 1269. The apertures 1376, 1374 should be aligned with each other, and also with the securement attachment and members 1370 so that the securement and attachment members 1370 will slide easily through the apertures 1374 in the panel 1340, and the apertures 1376 in the exterior rail member 1368.

Through this attachment, the mid rail member 1368 can be securely coupled to the panel 1340, to provide structural rigidity thereto. Preferably, the point at which the securement and attachment members 1370 extend through the mid rail member 1368 should be adjacent to one of the vertical support posts, to provide further support to the panel member 1340.

Figure 22:
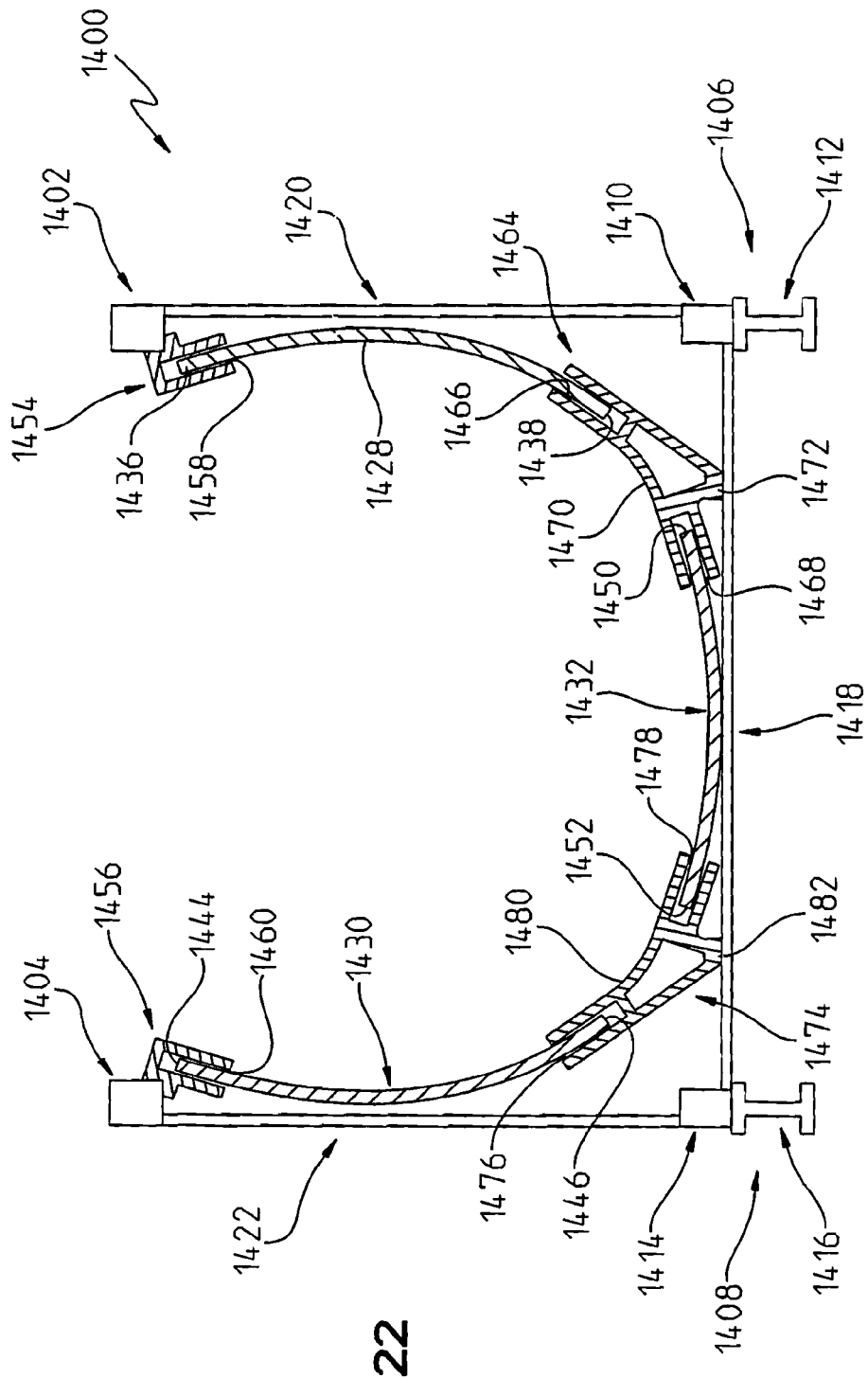
FIG. 22 is an end, sectional view of an elliptical bed alternate embodiment version of the present invention.
Figure 23:
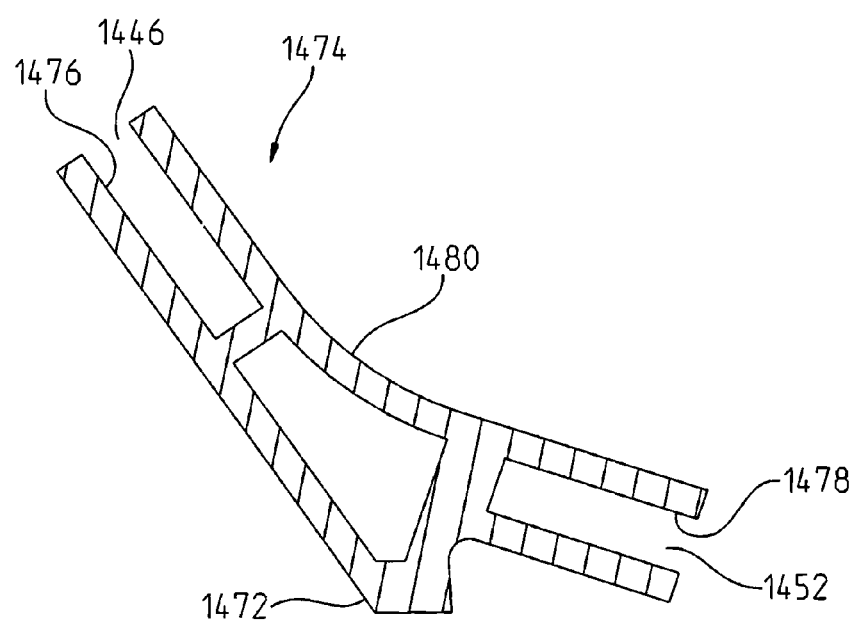
FIG. 23 is an enlarged, sectional view of a lower panel holding bracket of the elliptical version of the present invention shown in FIG. 22.

A fourth embodiment of the present invention is best shown in FIGS. 22-24. Fourth embodiment trailer 1400 has a generally square bottom type skeletal frame, with an elliptical bed. The elliptical bed trailer 1400 includes a first top rail 1402, and a second top rail 1404. First and second top rails 1402, 1404 extend along the top edge of the rail between the front and back of the trailer 1400.

The fourth embodiment trailer 1400 also includes a first bottom rail assembly 1406 and a second bottom rail assembly 1408. First bottom rail assembly 1406 and second bottom rail assembly 1408 include, respectively, a first bottom rail member 1410 and a second bottom rail member 1414, along with a first arched support member 1412, and a second arched support member 1416. The first and second arched supports 1412, 1416 are generally similar to their counterparts in other embodiments described above, as are the first and second bottom rail members.

The skeletal frame includes a plurality of generally evenly spaced bottom cross members, such as bottom cross member 1418, that is shown to extend laterally across the trailer, in a direction generally perpendicular to the direction of travel of the trailer 1400. The bottom cross member support 1418 extends between a first, generally vertically extending side post 1420 and a second, generally vertically extending side post 1422. The trailer 1400 employs a plurality of generally evenly spaced first and second vertical side posts, that are positioned generally similar to the side posts in the first and second embodiments of the present invention, 1100, 1200 discussed above.

Fourth embodiment trailer 1400 also includes a plurality of plastic panel members, that, like their plastic panel cousins discussed above, are designed to be strong enough to withstand the rigors imposed by a heavy load, but light enough so as to substantially reduce the weight of the trailer.

The panels of the fourth embodiment trailer 1400 include one or more first arcuately planar side panel members 1428. Although only a single first arcuately planar side panel member 1428 is shown in the drawings, it will be appreciated that in all likelihood, a series of panel members will be placed in an end-to-end relationship, so that, for example, the side panel of the truck will actually comprise several such side panels, rather than a single side panel 1428 that extends all the way between the front and rear of the trailer. In addition, there exists a second arcuately planar side panel member 1430, and a bottom arcuately planar bottom panel member 1432. The first arcuately planar side panel member 1428 is disposed adjacent to the first side of the trailer, as represented by the first vertical post 1420; the second arcuately planar side panel member is disposed adjacent to the second side of the trailer 1400, as embodied in second vertical post 1422; and the bottom arcuately planar member 1432 is disposed adjacent to the bottom of the trailer as represented by bottom cross member 1418.

The first arcuately planar side panel member 1428 includes a first or upper edge 1436, and a second or lower edge 1438. The second arcuately planar side panel 1430 also includes a first or upper edge 1444 disposed adjacent to the second rail 1404 and a second or lower edge 1446, disposed adjacent to the lower support member 1474. Similarly, the bottom panel has a first side edge 1450, disposed adjacent to the first lower support member 1472, and a second side edge 1452 that is disposed adjacent to, and is engaged with the second lower support member 1474.

A first, upper side support 1454 is welded to the top rail 1402; and a second upper side support 1456 is fixedly coupled, such as by welding, to the second top rail 1404. The first upper side support 1454 includes a panel receiving pocket 1458, for receiving the first edge 1436 of the first side panel 1428. Similarly, the second upper side support 1456 includes a panel receiving pocket 1460 for receiving the first upper edge 1444 of the side panel 1430.

The first lower panel support 1464 is fixedly coupled to the bottom support member 1418 and is provided for supporting the first side panel member 1428, and the bottom panel member 1432. The first lower panel support 1464 includes a first pocket 1466 for receiving a second or lower edge 1438 of the first panel 1428; and a second pocket 1468, that is disposed in a generally co-planar, but opposed relationship to first lower panel support 1464. Second pocket 1468 is provided for receiving the first end 1450 of the lower or bottom panel 1432. The first lower panel support 1464 also includes an arcuate surface 1480 to provide a smooth transition between the upper (interior) surfaces of the first side panel member 1428 and the lower panel member 1432. A base portion 1472 is provided that can be welded or otherwise fixedly coupled to the upper surface of the bottom support member 1418.

A second lower panel support member 1474 is generally similar to and in fact, designed to be the mirror image of the first panel support member 1464. Second lower panel support member 1474 includes a first pocket 1476 for receiving the lower edge 1446 of the second panel member; and a second pocket 1478 for receiving the second edge 1452 of the bottom support member 1432. A base portion 1482 is provided for fixedly coupling, such as by welding, the first panel support member 1464 to the base member 1418.

In addition to the end dump trailers discussed above, the composite, plastic panel/metal skeleton technology of the present invention could also be applied to use with a side dumping trailer. A side dump trailer often consists of a semi-trailer having hydraulic rams at the front and rear of the trailer that tilt the dump body about an axis generally parallel to the direction of travel of the trailer, to thereby tilt the trailer onto its side, spilling the material to either the left or right side of the trailer. The key advantages of the side dump are that it allows rapid unloading and can carry more weight in the western United States. In addition, it is believed to be less likely to upset (tipping over) while dumping, unlike the semi end dumps which are very prone to tipping over. Examples of prior art side dump trailers can be seen at http://web.archive.org/web/20071026110629/http://en.wikipedia.org/wiki/Dump_truck (26 Oct. 2007) and http://www.sidedumpindustries.com/side_dump_trailers.php Having described the invention in detail with reference to certain preferred embodiments, it will be appreciated that the invention is not limited to the embodiments described herein, but rather to the scope and spirit of the invention, that is defined only by the prior art and the allowable claims that may be achieved in the instant application.

What is claimed:

1. A dump bed assembly for coupling to a truck having a chassis for supporting the dump bed assembly, the dump bed assembly comprising
a cargo receiving dump bed coupled to the chassis and movable between a travel configuration and a dump configuration, the cargo receiving dump bed including a metal skeletal frame comprising a plurality of frame members that define a plurality of openings between the frame members; and a plastic bed comprising at least one load supporting plastic bed member coupled to and supported by the plurality of frame members and extending into the openings defined by the frame members.

2. The dump bed assembly of claim 1 wherein the chassis comprises at least one of a truck frame and a trailer frame further comprising a pivotal coupling for pivotably coupling the dump bed to the chassis; and a lift member for lifting the dump bed to cause the dump bed to pivot about the pivotal coupling to thereby move between the travel configuration and the dump configuration, and wherein the metal skeletal frame is absent from the plurality of openings.

3. The dump bed assembly of claim 1 wherein the dump bed includes a longitudinal axis extending generally along a primary intended direction of travel of the dump bed assembly, and
wherein the plurality of frame members include:
first and second longitudinal top rail members extending generally parallel to the longitudinal axis of the dump trailer assembly,
first and second longitudinal lower rail members extending generally parallel to the longitudinal axis of the dump trailer assembly, and disposed at a level lower than the longitudinal top rail members, and
first and second lateral rail members extending generally perpendicular to the longitudinal axis of the dump trailer assembly, the first and second lateral rail members being coupled to the first and second longitudinal top rail members and the first and second longitudinal lower rail members.

4. The dump bed assembly of claim 3 wherein the dump bed assembly comprises, in a cross section, an arcuate dump bed assembly, and wherein the first and second lateral rail members comprise
a first arcuate circumferential member,
a second arcuate circumferential member disposed generally rearwardly of, and in a parallel plane with the first arcuate circumferential member, and
a third arcuate circumferential member disposed generally rearwardly of, and in a parallel plane with the second arcuate circumferential member.

5. The dump bed assembly of claim 4 further comprising a sheet-like saddle member extending parallel to the longitudinal axis of the dump bed assembly, the saddle member including a portion disposed between the first and second longitudinal lower rail members and wherein the saddle member includes an arcuate upper surface, and wherein the at least one plastic bed member comprise at least one plastic bed member positioned to overlay and be supported by the arcuate saddle member.

6. The dump bed assembly of claim 3 wherein the dump bed assembly has a generally hemi-cylindrical shape; and the plastic bed includes a first side edge and a second side edge, and
further comprising a first slotted receiver extending generally parallel to the first longitudinal top rail for receiving the first side edge of the plastic bed, and a second slotted receiver extending generally parallel to the second longitudinal top rail for receiving the second side edge of the plastic bed.

7. The dump bed assembly of claim 6 wherein the first slotted receiver is formed as a part of the first longitudinal top rail member; and the second slotted receiver is formed as a part of the second longitudinal top rail member.

8. The dump bed assembly of claim 6 wherein the at least one of plastic bed member comprises a plurality of load supporting unitary plastic bed members having first side edges sized for being received in the first slotted receiver, and second side edges sized for being received in the second slotted receivers.

9. The dump bed assembly of claim 8 further comprising a sheet-like saddle member extending parallel to the longitudinal axis of the dump bed assembly and including a portion disposed between the first and second longitudinal lower rail members and positioned to underlay the plastic bed for supporting the plastic bed.

10. The dump bed assembly of claim 9 wherein the dump bed assembly includes a front end and a rear end, and the chassis includes a first and second axle assembly fixedly coupled to the dump bed assembly, and a lift member pivotably coupled to the front end of the dump bed assembly, wherein the lift member lifts the dump bed assembly by pivoting the dump bed assembly about an axis defined by the second axle assembly of the chassis.

11. The dump bed assembly of claim 1 wherein the dump bed assembly comprises, in a cross section, an arcuate dump bed assembly having an upper portion and a lower portion adjacent the lowest point of the arc, further comprising a sheet-like saddle member disposed under at least a portion of the lower portion,
wherein the saddle member includes an arcuate upper surface, and wherein the at least one plastic bed member comprise at least one plastic bed member positioned to overlay and be supported by the arcuate sheet like saddle member.

12. The dump bed assembly of claim 1 wherein the dump bed assembly includes a longitudinal axis extending generally along a primary intended direction of travel of the dump bed assembly, and
wherein the plurality of frame members include:
first and second longitudinal top rail members extending generally parallel to the longitudinal axis of the dump trailer assembly,
first and second longitudinal lower rail members extending generally parallel to the longitudinal axis of the dump trailer assembly and disposed at a lower level than the first and second longitudinal top rail members, and
first and second lateral rail members extending generally perpendicular to the longitudinal axis of the dump trailer assembly and extending between the first and second lower longitudinal rail members.

13. The dump bed assembly of claim 12 wherein at least one of the load supporting plastic bed members comprises a corrugated plastic bed member having a series of flutes.

14. The dump bed assembly of claim 1 wherein the at least one load supporting plastic bed member includes a first base plastic load supporting bed member, the first base plastic load supporting bed member including a first side edge, and a second side edge, and further comprising a first slotted receiver extending adjacent to and parallel with the first longitudinal lower rail member, and a second slotted receiver extending adjacent to and parallel with the second longitudinal lower rail member, wherein the first and second slotted receiver are sized and positioned to cause the first base plastic load supporting bed member to remain received by the first and second slotted receiver over a normal range of thermal expansion of the first base load supporting plastic bed member.

15. The dump bed assembly of claim 14 wherein the at least one load supporting plastic bed member comprises a load supporting first wall plastic bed member extending at least partially between the first longitudinal top rail member and the first longitudinal lower rail member, and a second load supporting wall plastic bed member extending at least partially between the second longitudinal top rail member and the second longitudinal lower rail member.

16. The dump bed assembly of claim 15 wherein the plurality of frame members includes at least one longitudinal mid-positioned longitudinal rail member extending generally parallel to, and positioned between the first longitudinal top rail member and the first longitudinal lower member, wherein the at least one first mid-positioned longitudinal rail member is coupled to the load supporting first wall plastic bed member.

17. The dump bed assembly of claim 16 wherein the load supporting first wall plastic bed member comprises an upper first wall plastic bed member having a lower portion coupled to the at least one mid-positioned longitudinal rail member, and a lower load supporting first wall plastic bed member having an upper portion coupled to the at least one longitudinal mid-positioned rail member.

18. The dump bed assembly of claim 17 further comprising a mid-positioned slotted receiver coupled to the at least one longitudinal mid-positioned rail member, the mid-positioned slotted receiver including an upper opening slot for receiving the lower portion of the upper load supporting first wall plastic bed member, and a lower opening slot for receiving the upper portion of the lower load supporting first wall plastic bed member.

19. The dump bed assembly of claim 1 wherein the first slotted receiver includes a first receiving slot for receiving the first base plastic bed member, and a second receiving slot for receiving a load supporting wall plastic bed member.

20. A dump bed assembly for coupling to one of a truck or trailer having a chassis for supporting the dump bed assembly, the dump bed assembly comprising a cargo receiving dump bed coupled to the chassis and movable between a travel configuration and a dump configuration, the dump bed including a longitudinal axis extending generally along a primary intended direction of travel of the dump bed assembly, the cargo receiving dump bed including a metal skeletal frame comprising a plurality of frame members that define a plurality of openings between the frame members; and a plastic bed comprising at least one plastic bed member coupled to and supported by the plurality of frame members and extending into the openings defined by the frame members, wherein the plurality of frame members include:

first and second longitudinal top rail members extending generally parallel to the longitudinal axis of the dump trailer assembly, first and second longitudinal lower rail members extending generally parallel to the longitudinal axis of the dump trailer assembly, and disposed at a level lower than the longitudinal top rail members, and first and second lateral rail members extending generally perpendicular to the longitudinal axis of the dump trailer assembly, the first and second lateral rail members being coupled to the first and second longitudinal top rail members and the first and second longitudinal lower rail members wherein the dump bed assembly has a generally hemi-cylindrical shape; and the plastic bed includes a first side edge and a second side edge, and further comprising a first slotted receiver extending generally parallel to the first longitudinal top rail for receiving the first side edge of the plastic bed, and a second slotted receiver extending generally parallel to the second longitudinal top rail for receiving the second side edge of the plastic bed, the first slotted receiver being formed as a part of the first longitudinal top rail member; and the second slotted receiver being formed as a part of the second longitudinal top rail member, wherein the metal skeletal frame is disposed primarily exteriorly of the plastic bed, the plastic bed includes at least one unitary plastic bed member that extends between the first slotted receiver and the second slotted receiver, and wherein the unitary plastic bed member and the first and second slotted receivers are sized and positioned to cause the plastic bed member to remain received by the first and second slotted receivers over a normal range of thermal expansion of the plastic bed member.

21. A dump bed assembly for coupling to one of a truck or trailer having a chassis for supporting the dump bed assembly, the dump bed assembly comprising a cargo receiving dump bed coupled to the chassis and movable between a travel configuration and a dump configuration, the dump bed including a longitudinal axis extending generally along a primary intended direction of travel of the dump bed assembly, the cargo receiving dump bed including a metal skeletal frame comprising a plurality of frame members that define a plurality of openings between the frame members; and a plastic bed comprising at least one plastic bed member coupled to and supported by the plurality of frame members and extending into the openings defined by the frame members, wherein the plurality of frame members include first and second longitudinal top rail members extending generally parallel to the longitudinal axis of the dump trailer assembly, a first slotted receiver extending generally parallel to the first longitudinal top rail for receiving the first side edge of the plastic bed, and a second slotted receiver extending generally parallel to the second longitudinal top rail for receiving the second side edge of the plastic bed, wherein the metal skeletal frame is disposed primarily exteriorly of the plastic bed, the plastic bed includes at least one unitary plastic bed member that extends between the first slotted receiver and the second slotted receiver, and wherein the unitary plastic bed member and the first and second slotted receivers are sized and positioned to cause the plastic bed member to remain received by the first and second slotted receivers over a normal range of thermal expansion of the plastic bed member.

* * * * *